(12) United States Patent
Okamura

(10) Patent No.: US 8,253,994 B2
(45) Date of Patent: Aug. 28, 2012

(54) OPTICAL SCANNER AND IMAGE FORMING APPARATUS

(75) Inventor: Hideki Okamura, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1168 days.

(21) Appl. No.: 12/082,780

(22) Filed: Apr. 14, 2008

(65) Prior Publication Data
US 2008/0266618 A1    Oct. 30, 2008

(30) Foreign Application Priority Data
Apr. 24, 2007 (JP) ................. 2007-113869

(51) Int. Cl.
*H04N 1/04* (2006.01)
(52) U.S. Cl. .................. 358/475; 358/474; 358/481
(58) Field of Classification Search .......... None
See application file for complete search history.

(56) References Cited

U.S. PATENT DOCUMENTS
6,563,624 B1    5/2003    Ishihara

FOREIGN PATENT DOCUMENTS

| JP | 03-125111 | | 5/1991 |
|---|---|---|---|
| JP | 07-318796 | | 12/1995 |
| JP | 9-043509 | | 2/1997 |
| JP | 2001-125028 | | 5/2001 |
| JP | 2001125028 A | * | 5/2001 |
| JP | 2001-194610 | | 7/2001 |

* cited by examiner

*Primary Examiner* — Thierry Pham
(74) *Attorney, Agent, or Firm* — Jordan and Hamburg LLP

(57) ABSTRACT

An image forming optical equipment is disposed between a polygon mirror and the surface of a photoreceptor drum to form an image on the surface of the photoreceptor drum with scanning light, while at the same time, keeping its scanning speed nearly-constant, comprises a first scanning light lens, which has a positive power in the main scanning direction and a negative power in the sub-scanning direction, a second scanning light lens, which has a negative power in the main scanning direction and a positive power in the sub-scanning direction and is disposed in the side closer to the photoreceptor drum than the first scanning light lens, and a diffraction optical element, which is provided on the surface of the cylindrical lens in the beam light advancing path between a light source and a polygon mirror.

12 Claims, 20 Drawing Sheets

Angle of incidence to the polygon  Main direction: 70[deg]
Polygon shape  inscribed radius 25.98[mm] hexahedron
Aperture shape  3.3 × 1.0[mm] ellipse
Wavelength/Temperature  780[nm] 25[°C]
Pupil distance  15[mm]
Polygon offset  −1.15[mm]
Lens offset  0[mm]
Focal length  155[mm]
Maximum image height  108[mm]

Scanning light lens specification (two-group, two-lens)

| Surface number | Curvature radius in the main scanning direction (rm) | Curvature radius in the sub-scanning direction (rs0) | Surface distance | Refractive index | Grade | Surface shape |
|---|---|---|---|---|---|---|
| 1 | −22.781 | −8.000 | 7.00 | 1.507595 | Z-330R | Free curved surface |
| 2 | −16.978 | 23.409 | 23.50 | | | Free curved surface |
| 3 | −73.771 | 49.349 | 4.50 | 1.507595 | Z-330R | Free curved surface |
| 4 | −256.546 | −19.106 | 130.00 | | | Cylinder surface |

Cylindrical lens specification

| Surface number | Curvature radius in the main scanning direction | Curvature radius in the sub-scanning direction | Surface distance | Refractive index | The kind of glass materials |
|---|---|---|---|---|---|
| 1 | ∞ | 17.795 | 3.00 | 1.485 | PMMA |
| 2 | ∞ | ∞ | 34.58 | | |

Aspherical coefficients and conic coefficients of the scanning light lens

| Surface number | A3 | A4 | A5 | A6 | A8 | A10 | Km |
|---|---|---|---|---|---|---|---|
| 1 | 0 | 2.00E−05 | 0 | 0 | 0 | 0 | 0 |
| 2 | 0 | 1.34E−05 | 0 | 2.54E−08 | 0 | 0 | −0.4709 |
| 3 | 0 | 6.14E−06 | 0 | −3.24E−09 | 7.11E−13 | 4.38E−16 | 2.4349 |
| 4 | 0 | −1.31E−06 | 0 | 9.80E−10 | −1.12E−12 | 4.91E−16 | 39.8027 |

| Surface number | B1 | B2 | B3 | B4 | B6 | B8 | B10 |
|---|---|---|---|---|---|---|---|
| 1 | 0 | 2.44E−02 | −2.98E−04 | −1.00E−04 | 0 | 0 | 0 |
| 2 | 2.51E−01 | −5.49E−03 | −8.13E−04 | 6.05E−05 | 0 | 0 | 0 |
| 3 | 8.19E−02 | −2.16E−03 | 4.08E−05 | 4.28E−06 | 0 | 0 | 0 |
| 4 | 1.46E−03 | −6.33E−03 | 9.27E−06 | 2.53E−06 | 0 | 0 | 0 |

Fig.26
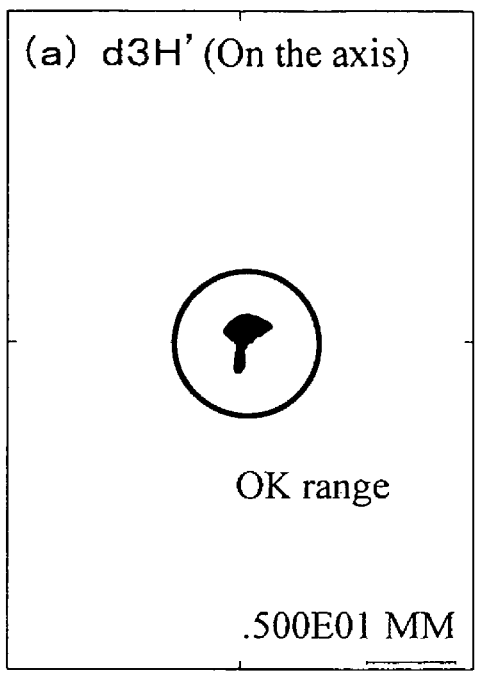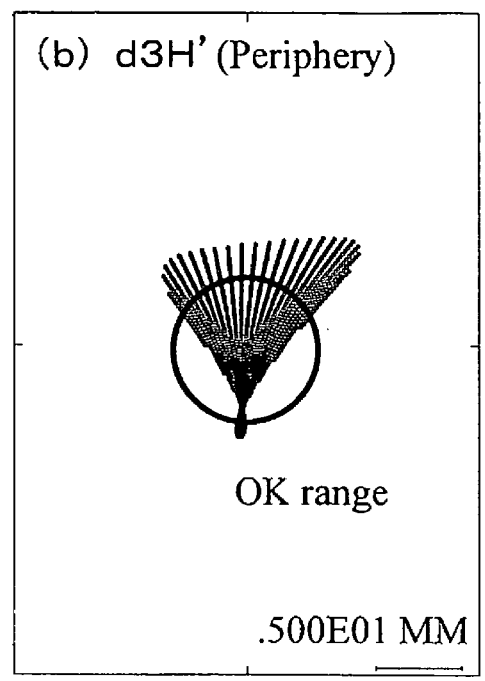

OPTICAL SCANNER AND IMAGE FORMING APPARATUS

BACKGROUND OF THE INVENTION

1. Field of the Invention

The present invention relates to an optical scanner and an image forming apparatus provided with the same, which form an image with the light emitted from a light source on a surface to be scanned, such as a photoreceptor drum, while at the same time, scanning said light in a linear direction (main scanning direction).

2. Description of the Related Art

An electrophotographic image forming apparatus comprises an optical scanner for forming an image on a surface to be scanned (a surface of the photoreceptor drum) by scanning a light for writing an electrostatic latent image with a optical scanner unit such as a polygon mirror through a f-theta lens. In the thus constituted optical scanner, it is important to suffice the following three optical properties for a high-precision image formation (writing an electrostatic latent image).

In short, the first optical property is that the image curvature on the surface to be scanned is small (having uniform spot diameters). The second optical property is that the scanning speed of the light in the main scanning direction on the surface to be scanned is constant (having a good f-theta property). The third optical property is that the magnification (sub-scanning magnification) in the sub-scanning direction, which is orthogonal to the main scanning direction, is small. When the sub-scanning magnification is small, the spot diameters in the sub-scanning direction become uniform across the entire functional scanning area, even if the angles of the light reflecting surfaces of the optical scanner unit are not uniform. The third optical property is particularly important for a multi-beam scanning apparatus, that scans a plurality of light fluxes at one time, to keep the pitch distance of the scanning line uniform.

Furthermore, downsizing of optical scanners have been demanded to meet the space-saving needs for image forming apparatuses.

Conventionally, for example, Japanese Unexamined Patent Publication No. H07-318796 has been disclosing a f-theta lens system composed of the combination between a glass toric lens and a plastic toric lens, having a cylindrical lens on the incident surface side of the light flux and a toric surface on the light-emitting surface side.

In addition, in Japanese Unexamined Patent Publication No. H03-125111, an optical system comprising a holographic f-theta lens having a power only in the main scanning direction and a columnar lens having a power in the sub-scanning direction has been disclosed, wherein such as corrections of the f-theta property and the surface inclination, and the separation of a primary diffracted light from the diffracted lights in other degrees are conducted.

However, since the f-theta lens system disclosed in Japanese Unexamined Patent Publication No. H07-318796 is configured to have one cylindrical surface, there remains a problem in that the spherical aberration correction has a less degree of freedom, and thus the image curvature becomes large. Furthermore, the f-theta lens system disclosed in the embodiment 1 in Japanese Unexamined Patent Publication No. H07-318796 has a larger power in the main scanning direction of a glass toric lens disposed in the side of a surface to be scanned than a power in the main scanning direction of a plastic toric lens disposed in the polygon mirror side, and thus, the size in the main scanning direction of the glass toric lens is required to be relatively large, opposing the downsizing of the apparatus. Moreover, there still remains a problem in the f-theta lens system disclosed in the embodiment 2 in Japanese Unexamined Patent Publication No. H07-318796, in that since both the powers in the sub-scanning direction of the plastic toric lens and the power in the sub-scanning direction of the glass toric lenses are positive, the sub-scanning magnification becomes large when both the lenses are positioned close to a polygon mirror side for the purpose of downsizing the apparatus. If the sub-scanning magnification is large, the unevenness of the spot diameters of the light on the surface to be scanned relative to the unevenness of the reflecting surface of the optical scanner unit (such as polygon mirror) becomes large. Additionally, Japanese Unexamined Patent Publication No. H07-318796 does not particularly describe about the homogenization of the sub-scanning magnification.

In addition, in the optical system disclosed in Japanese Unexamined Patent Publication No. H03-125111, when the material of the columnar lens is, for example, glass, the lens has been more advantageous in cost performance than a f-theta lens combining a plurality of lenses. However, compared with a plastic lens, the glass lens has still been expensive. Moreover, in the optical system shown in the patent literature 2 (Japanese Unexamined Patent Publication No. H03-125111), if the material of the columnar lens is, for example, plastic, there remains a problem, in that the out-of-focus in the sub-scanning direction occurs from the change of a oscillation wavelength of the light flux and of the environment (particularly, change of temperature). And also, when the columnar lens is placed close to the surface to be scanned in order to avoid the occurrence of out-of-focus, the size of the columnar lens in the main scanning direction is required to be large, resulting in the system being against downsizing of the apparatus and expensive.

In view of the above problem residing in the prior arts, it is an object of the present invention to provide an optical scanner and an image forming apparatus provided with the same, wherein, with a compact apparatus configuration, the image curvature on the surface to be scanned, and the unevenness in the sub-scanning magnification as well as the optical scanning speed in the main scanning direction can be reduced, and moreover, the focus shift in the sub-scanning direction on the surface to be scanned is small with respect to the change in oscillation wavelength of the light flux and environment.

SUMMARY OF THE INVENTION

In order to achieve the above goal, an optical scanner according to the present invention comprises each of the constituent elements described in the following (1) to (4).

(1) an optical scanning means (for example, such as a polygon mirror) for reflecting on a reflecting surface a light flux emitted from a light source, while at the same time, scanning said light flux in a linear direction as a main scanning direction toward a prescribed surface to be scanned (such as a surface of an image carrier).

(2) an image forming means disposed in between the optical scanning means and the surface to be scanned for forming an image on the surface to be scanned with a scanning light scanned by the optical scanning means, while at the same time, keeping the scanning speed of the scanning light nearly-constant on the surface to be scanned.

(3) a first lens to be comprised in the image forming means having a positive power in the main scanning direction and a negative power in the sub-scanning direction, that is orthogonal to the main scanning direction.

(4) a second lens to be comprised in the image forming means, disposed in a closer position to the surface to be scanned than the first lens, and having a negative power in the main scanning direction and a positive power in the sub-scanning direction.

More particularly, an optical scanner according to the present invention desirably fulfills at least any one of the conditions (a1) or (b1) in below, under the condition that: a power of the image forming means, that combines the first lens and the second lens, in the main scanning direction is $\phi tm$; a power of the first lens in the main scanning direction is $\phi 1m$; and a power of the second lens in the main scanning direction is $\phi 2m$.

$$-1.20 \leq \phi 2m/\phi tm \leq -0.48 \quad (a1)$$

$$1.32 \leq \phi 1m/\phi tm \leq 2.00 \quad (a2)$$

And also, an optical scanner according to the present invention desirably fulfills the following inequality (b1) under the condition that the power of the first lens in the sub-scanning direction is $\phi 1s$, and the power of the second lens in the sub-scanning direction is $\phi 2s$.

$$-2.98 \leq \phi 1s/\phi 2s \leq -0.81 \quad (b1)$$

Additionally, it is desired for the first and second lenses to be made of resin, for its high-workability (high-productivity).

In an optical scanner according to the present invention, the image forming means comprising the first and second lenses constitutes a f-theta lens system.

Generally, in the f-theta lens system comprised of two lenses, the second lens in the downstream side of the advancing direction of the light (in the side close to the surface to be scanned) is positioned close to the surface to be scanned, more specifically, the second lens is disposed in a position having wider width of the light flux in the sub-scanning direction, so that the sub-scanning magnification of the scanning lights on the surface to be scanned can be smaller. However, if so, the lens size of the second lens in the main scanning direction is required to be larger, opposing the downsizing of the apparatus.

In response, according to the present invention, the width of scanning light in the sub-scanning direction after its passage through the first lens is wider than the conventional one (the power of the first lens is positive) in the image forming means, for the first lens having a negative power in the sub-scanning direction. This enables the sub-scanning magnification of scanning light on the surface to be scanned to be small, even if the second lens is disposed in a position far from the surface to be scanned (a position closer to the reflecting surface of the optical scanning means). And also, in the position close to the optical scanning means, the size in the main scanning direction of the second lens disposed therein can be small, since the scanning range of the light is relatively narrow. Consequently, the present invention enables the image curvature on the surface to be scanned in the sub-scanning direction to be small, while at the same time, downsizing the apparatus.

In addition, when the positions of the first and second lenses become far from the surface to be scanned, it is required to make the shapes of these lenses to be rotationally symmetric aspherical surface, in order to form an image (to converge) with scanning lights on the surface to be scanned. However, by employing a lens made of resin as the first and second lenses, the second lens can be produced (be manufactured) relatively easily. Moreover, since the power of the first lens in the sub-scanning direction is negative, the size (height) in the sub-scanning direction of the second lens becomes slightly large. However, the advantage obtained from reducing the size (width) of the second lens in the main scanning direction is more contributory to downsizing the apparatus.

And also, in the image forming means, the light focus of scanning lights in the main scanning direction is conducted only by the first lens, and therefore, the curvature and the thickness of the first lens grow large. However, even if the curvature and the thickness of the first lens having a small size (width) in the main scanning direction grow large, it is more contributory to downsizing of the entire apparatus, than the configuration in which a part of the light focus is conducted by the second lens having a large size in the main scanning direction (to make the power of the second lens in the main scanning direction positive).

And also, since the second lens, which mainly adjusts the focal length of scanning lights, becomes a thin lens of small curvature (the power is negative), the image curvature in the main scanning direction on the surface to be scanned can be kept small.

For example, if each power of the first and second lenses in the main scanning direction fulfills the conditions in the above-described inequalities: (a1) and (a2), the unevenness of the image curvature in the main scanning direction on the surface to be scanned and of the scanning speed of the scanning lights can be suppressed to the level sufficient for image quality when writing of an electrostatic latent image is conducted with the scanning lights.

Similarly, if each power of the first and second lenses in the sub-scanning direction fulfills the condition in the above-described inequality (b1), the image curvature in the sub-scanning direction on the surface to be scanned can be kept small to the level sufficient for image quality when writing of an electrostatic latent image is conducted with the scanning lights.

Moreover, it is further preferred for an optical scanner according to the present invention to comprise: a collimator lens, an aperture, and a cylindrical lens which are disposed sequentially from the light source side in the advancing path of the light flux in between the light source and the optical scanning means, and furthermore, a diffraction optical element disposed in a light path of the light flux from passing through the collimator lens and reaching to the light scanning means. For example, the diffraction optical element may be provided on a surface of the cylindrical lens.

This enables a focal length of the cylindrical lens to be changed, when fluctuations of the oscillation wavelength of the light emitted from the light source or of the ambient temperature are occurred, by means of the diffraction optical element in the direction negating the focus shift (out-of-focus) of scanning lights on the surface to be scanned occurred from those fluctuations. In particular, if the first and second lenses are made of resin, compared with a glass lens, the focus shift of scanning lights caused from the fluctuation of the ambient temperature is relatively large, thereby obtaining a significant focus correction effect by the diffraction optical element.

And also, the present invention may also be regarded as an image forming apparatus for scanning a light for writing an electrostatic latent image on the surface of a image carrier (a typical example is a photoreceptor drum) with an optical scanner that is in accordance with the present invention.

According to the present invention, one lens (the second lens), that is closer to a surface to be scanned of two lenses composing a f-theta lens, can be disposed in a upstream side in the advancing direction of scanning lights, and moreover, the positive power enlarging the curvature as well as the thickness of a lens can be handled only by the first lens having small size in the main scanning direction, so that the downsizing of the apparatus is achieved. Furthermore, with the power of two lenses composing a f-theta lens system fulfilled the condition of each inequality described above, the unevenness of the image curvature on a surface to be scanned, the sub-scanning magnification, and the light scanning speed in the main scanning direction can be reduced, and moreover, with the action of the diffraction optical element, the focus shift (out-of-focus) in the sub-scanning direction on a surface to be scanned in regards to changes in the oscillation wavelength of a light flux and in the environment may be reduced. As a result, the writing of an electrostatic latent image with a light scanned by an optical scanner according to the present invention performs a high-precision image formation.

BRIEF DESCRIPTION OF THE DRAWINGS

FIG. 4 shows an example of the embodiment condition of an optical scanner Y;

FIG. 26 shows a spot diagram of scanning lights at the time when the power condition in the sub-scanning direction of a scanning light lens in an optical scanner Y has been changed (4).

DETAILED DESCRIPTION OF THE PREFERRED EMBODIMENTS

In what follows, an embodiment of the present invention is described as referring to the accompanied figures in order to provide sufficient understanding.

Figure 1:
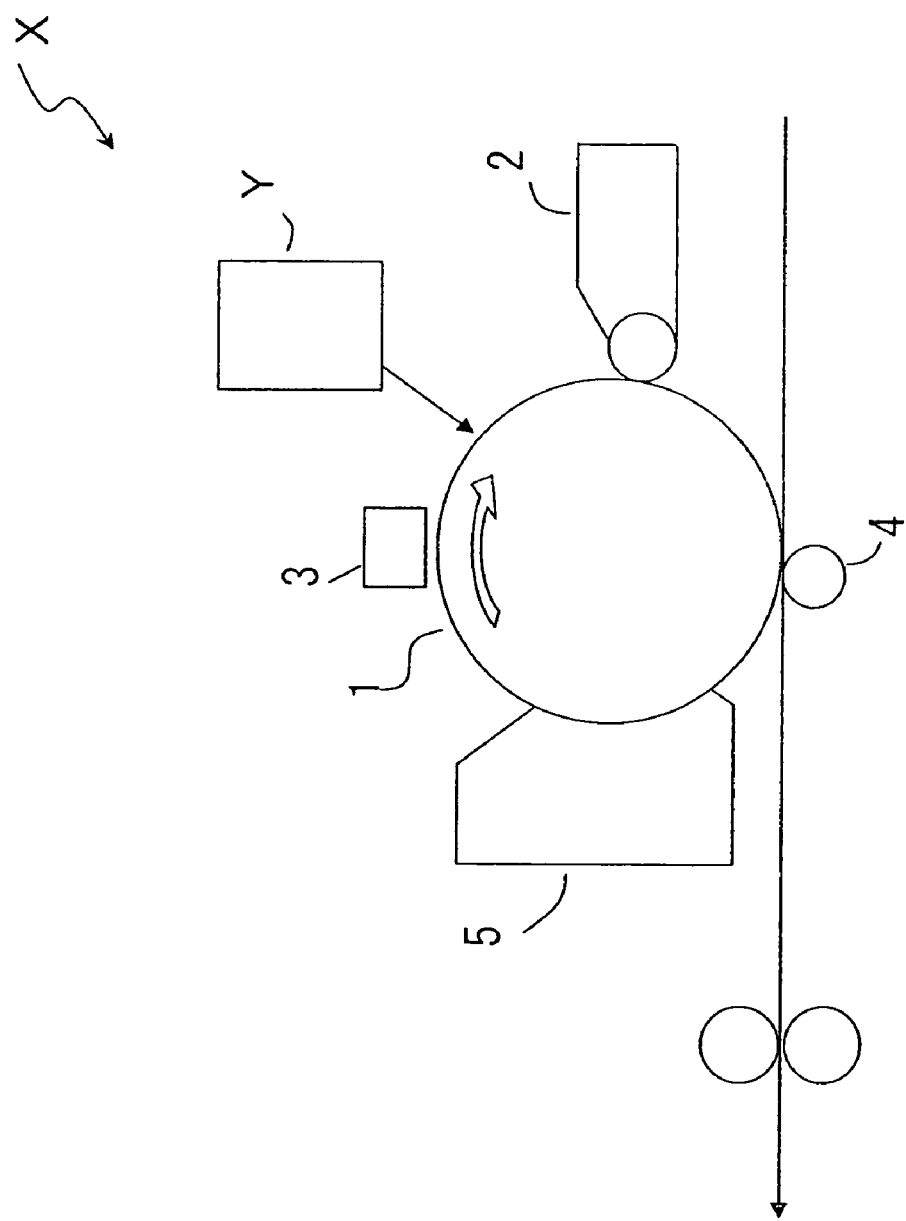
FIG. 1 shows a schematic configuration diagram of a main part (image forming unit) of an image forming apparatus X which comprises an optical scanner according to one embodiment of the present invention.

Firstly, as referring to a schematic configuration diagram shown in FIG. 1, the configuration of a main part of an image forming apparatus X, which comprises an optical scanner according to one embodiment of the present invention, is described.

The image forming apparatus X is an electrophotographic image forming apparatus, such as a copier, a printer, and a facsimile, for executing image formation with toners.

The image forming apparatus X comprises such as an image forming unit (the section shown in FIG. 1) for executing image formation on a recording paper by forming a toner image, a paper feeding unit (not shown) for feeding the recording paper to the image forming unit, and a paper discharging unit (not shown) for discharging the recording paper with the image formation executed thereon.

As illustrated in FIG. 1, the image forming apparatus X comprises: a photoreceptor drum 1 (image carrier) for supporting a toner image, a charger 3 for charging the surface of the photoreceptor drum 1 uniformly, an optical scanner Y for scanning a beam light on a surface of the photoreceptor drum 1 to write an electrostatic latent image by exposing the surface with the scanning light, a developing unit 2 for developing a toner image by feeding a toner to the electrostatic latent image, a transfer roller 4 for transferring the toner image onto a recording paper, and an electric discharger 5 for discharging the surface of the photoreceptor drum 1 after the transfer of the toner image onto the recording paper.

The charger 3 uniformly charges a surface of the photoreceptor drum 1 along its axial direction.

The developing unit 2 comprises a developing roller for feeding a toner to the photoreceptor drum 1, and develops an electrostatic latent image on the photoreceptor drum 1 with toners. According to the potential gap between the electrical potential applied to the developing roller (developing bias potential) and the electrical potential on the surface of the photoreceptor drum 1, the toner on the developing roller is pulled toward the surface of the photoreceptor drum 1, so that the electrostatic latent image is developed as a toner image.

In addition, the image forming apparatus X also comprises other well-known constituent elements that are comprised in a general electrophotographic image forming apparatus, however, the explanation thereof is eliminated here.

Figure 2:
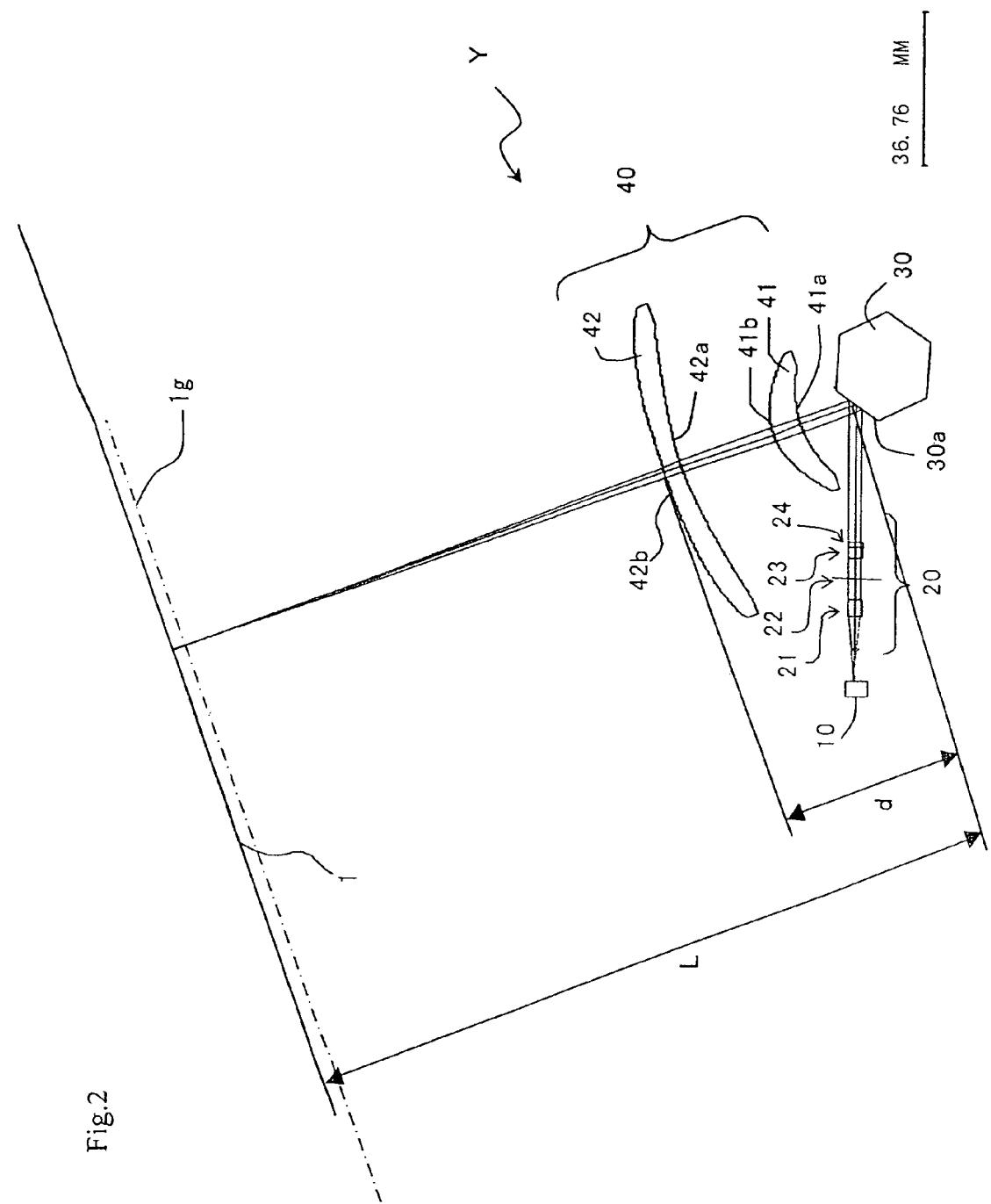
FIG. 2 shows an schematic diagram of an optical scanner Y and a light path of a beam light viewed from the sub-scanning direction.
Figure 3:
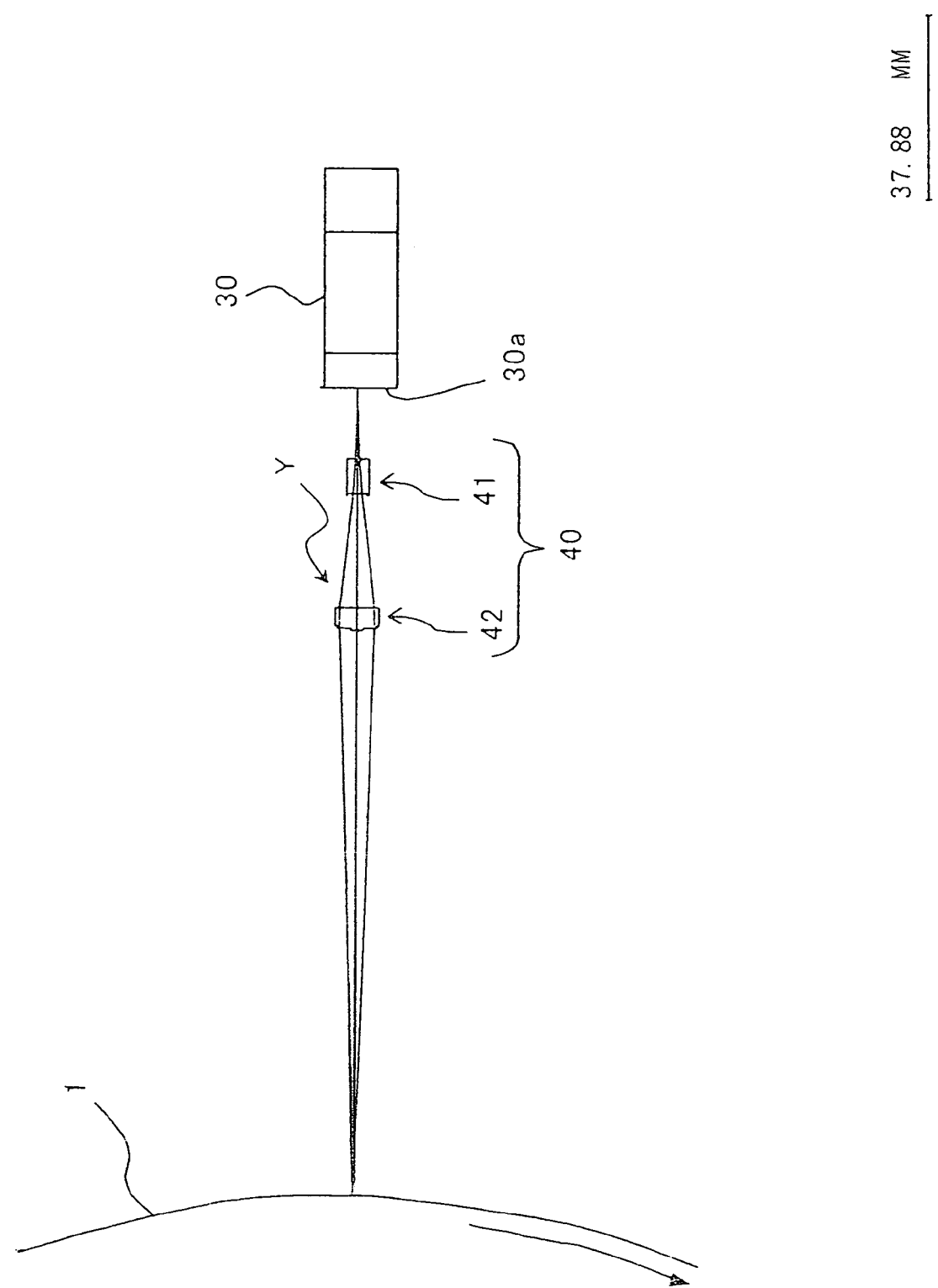
FIG. 3 shows an schematic diagram of a cross-section of an optical scanner Y and a light path of a scanning light viewed from the main scanning direction.
Figure 5:
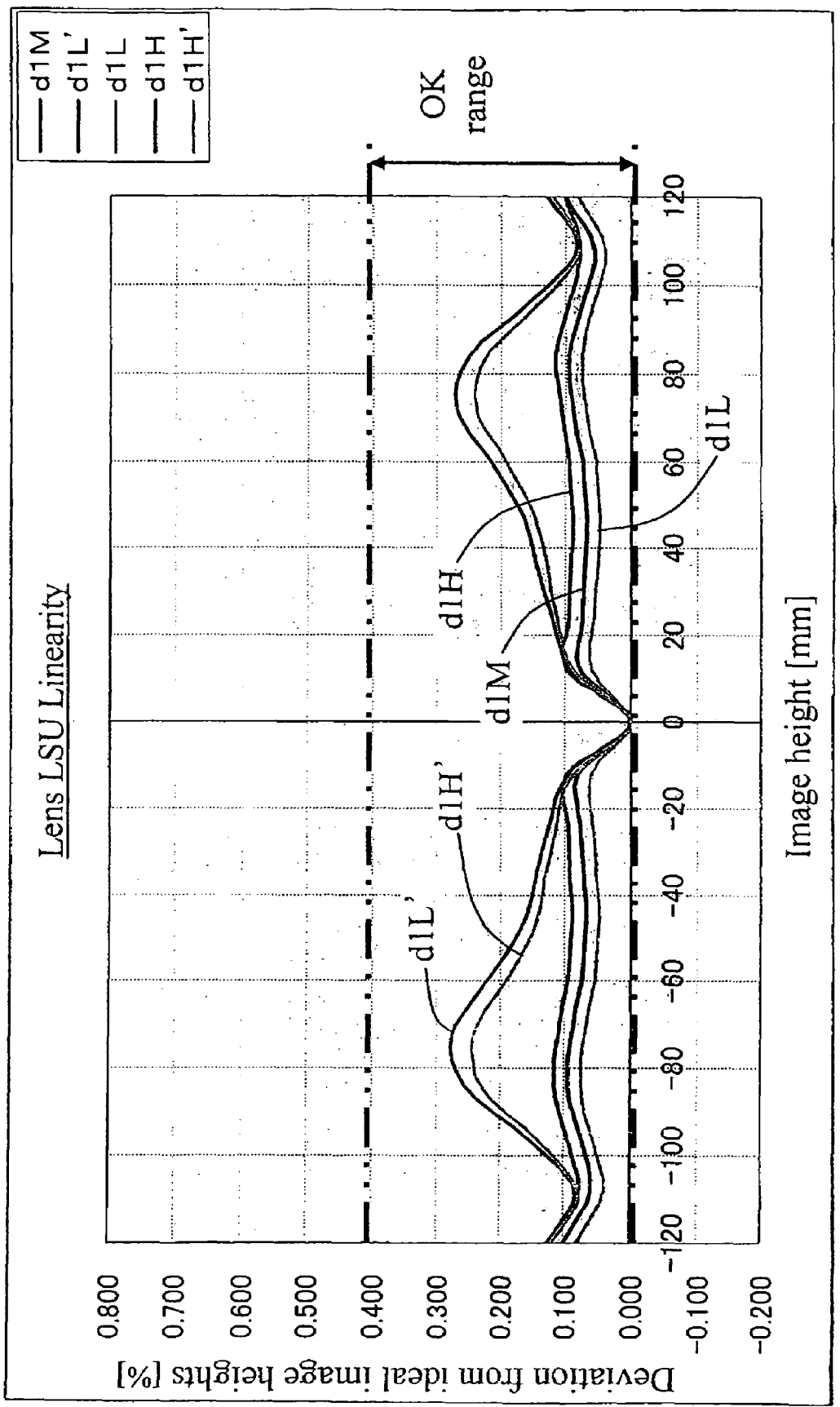
FIG. 5 shows a graph indicating an experimental result evaluating the effect affecting a linearity of a scanning light of a scanning light lens in an optical scanner Y, at the time when the first power condition in the main scanning direction of the scanning light lens has been changed.

Next, as referring now to a plain view shown (the figure viewed from the sub-scanning direction) in FIG. 2 as well as to a cross-sectional view shown in FIG. 3, the configuration of the optical scanner Y according to one embodiment of the present invention is described.

As shown in FIGS. 2 and 3, the optical scanner Y comprises a light source 10, an incident light adjusting optical equipment 20, a polygon mirror 30, and an image forming optical equipment 40 (f-theta lens system).

The light source 10 is, such as, a semiconductor laser which emits a beam light (light flux) for writing an electrostatic latent image.

The incident light adjusting optical equipment 20 comprises a collimator lens 21, an aperture 22, and cylindrical lens 23 disposed sequentially from the side of the light source in the advancing path of a beam light (light flux) in between the light source 10 and the polygon mirror 30. With these optical equipments, the incident light adjusting optical equipment 20 forms the shape of the emission light (beam light) emitted from the light source 10 before the incidence into the polygon mirror 30.

The beam light emitted from the light source 10 is converted into a parallel light by passing through the collimator lens 21, then formed by passing through the aperture 22, and then adjusted in its light diameter by means of the cylindrical lens 23 before reaching the polygon mirror 30.

And also, a diffraction optical element 24 is provided on the surface of the cylindrical lens 23. The diffraction optical element 24 may be disposed in any positions in the light path of the beam light (light flux) from passing through the collimator lens 21 to reaching to the polygon mirror 30. The action of the diffraction optical element 24 is described later in details.

The polygon mirror 30 is a rotational body having a plurality of reflecting surfaces 30a, and reflects the beam light (light flux) for writing an electrostatic latent image emitted from the light source 10 on its reflecting surfaces 30a, while at the same time, scanning the beam light in the main scanning direction (the direction parallel to the rotational axis 1g of the photoreceptor drum 1), which is a linear direction toward the surface of the photoreceptor drum 1 as a surface to be scanned (one example of the optical scanning means). Additionally, as a beam light scanning means, other than the polygon mirror 30, such as MEMS (Micro-Electro-Mechanical System) mirror may be employed.

The image forming optical equipment 40 is disposed in between the polygon mirror 30 and the surface of the photoreceptor drum 1, and forms an image on the surface of the photoreceptor drum 1 with the beam light (hereinafter referred to as "scanning light") scanned by the polygon mirror 30 (adjusts into a desired spot diameter and emits), while at the same time, functioning as a so-called f-theta lens to keep the scanning speed of the scanning light on the surface of the photoreceptor drum 1 constant, as a lens system (one example of the image forming means). As shown in FIG. 2 and FIG. 3, the image forming optical equipment 40 comprises a first scanning light lens 41 and a second scanning light lens 42 disposed sequentially from the upstream side in the advancing direction of a scanning light.

FIG. 3 shows a cross-sectional view taken at the center position of the scanning range of the light in the main scanning direction (the center position of the first scanning light lens 41 and the second scanning light lens 42 in the main scanning direction). And also, the light path of the scanning light shown in FIG. 2 is at the time when the scanning light from the polygon mirror 30 is in the center position in the main scanning range (the entire scanning range in the main scanning direction).

The first scanning light lens 41 is positioned closer to the polygon mirror 30 than the second scanning light lens 42, and formed as extending in the main scanning direction so that the scanning light passes therethrough. The first scanning light lens 41 (corresponding to the first lens) has a positive power in the main scanning direction, and at the same time, having a negative power in the direction orthogonal to the main scanning direction (the direction orthogonal to the rotational axis 1g of the photoreceptor drum 1: hereinafter referred to as "sub-scanning direction").

In addition, the second scanning light lens 42 is disposed in the position closer to the surface side of the photoreceptor drum 1 than the first scanning light lens 41, and formed as extending in the main scanning direction so that the scanning light passes therethrough. Since the second scanning light lens 42 has a broader scanning range of the scanning light due to its position having a longer distance from the polygon mirror 30 than the first scanning light lens 41, it has a larger size in the main scanning direction (width) than the first scanning light lens 41. The second scanning light lens 42 has a negative power in the main scanning direction, while at the same time, having a positive power in the sub-scanning direction (corresponding to the second lens).

Here, the first scanning light lens 41 and the second scanning light lens 42 are positioned in the side closer to the reflecting surface 30a of the polygon mirror 30 than the intermediate position between the reflecting surface 30a of the polygon mirror 30 and the surface of the photoreceptor drum 1. More specifically, when the distance from the reflecting surface 30a of the polygon mirror 30 to the surface of the photoreceptor drum 1 is "L", and the one from the reflecting surface 30a of the polygon mirror 30 to the surface 42b of the second scanning light lens 42 in the side of the photoreceptor drum 1 is "d", the positions can be expressed in an inequality: [d<L/2].

As illustrated in FIG. 3, in the image forming optical equipment 40 of the optical scanner Y, the width of the scanning light in the sub-scanning direction after its passage through the first scanning light lens 41 expands, due to the negative power of the first scanning light lens 41 in the sub-scanning direction. And thus, in the optical scanner Y, even when the second scanning light lens 42 is positioned relatively far from the surface of the photoreceptor drum 1 (the position close to the polygon mirror 30), the sub-scanning magnification (magnification in the sub-scanning direction) of the scanning light on the surface of the photoreceptor drum 1 can be kept small. And also, in the position close to the polygon mirror 30 ([d<L/2]), the light scanning range is relatively narrow, and thus, the size in the main scanning direction of the second scanning light lens 42 disposed therein can be small. Consequently, the optical scanner Y is compact, and at the same time, having a small image curvature in the sub-scanning direction on the surface of the photoreceptor drum 1.

Here, when the positions of the first scanning light lens 41 and the second scanning light lens 42 are moved far away from the surface of the photoreceptor drum 1, the shapes of these lenses 41 and 42 need to be a rotationally symmetric aspherical surface in order to form an image with (converge) the scanning light on the surface of the photoreceptor drum 1. In response, a lens made of resin may be employed for the first and second scanning light lenses 41 and 42, so that the manufacture (the processing) of both the lenses 41 and 42 can be relatively simple.

The cross-sectional shape in the sub-scanning direction (the rotationally symmetric aspherical surface) of each surface of the first scanning light lens 41 (the surface 41a in the incident side of the scanning light and the surface 41b in the light emission side of the same) as well as each surface of the second scanning light lens 42 (the surface 42a in the incident side of the scanning light and the surface 42b in the light emission side of the same) can be expressed in the following formula (c1).

$$(c1)\begin{cases} f(y) = \dfrac{y^2/r_m}{1 + \sqrt{1-(1+K_m)y^2/r_m^2}} + A_3 y^3 + A_4 y^4 + \\ A_5 y^5 + A_6 y^6 + A_8 y^8 + A_{10} y^{10} \\ r_s = r_{s0} + B_1 y + B_2 y^2 + B_3 y^3 + B_4 y^4 + B_6 y^6 + B_8 y^8 + \\ B_{10} y^{10} \\ x = f(y) + r_s\left(1 - \sqrt{1-(z/r_s)^2}\right) \end{cases}$$ [Formula 1]

In the formula (c1): "x" is an amount of sags in the light axial direction of the scanning light (beam light), and "y" is the position in the main scanning direction based on the center line (bisector) in the scanning range in the main scanning direction, "z" is the position in the sub-scanning direction, "rm" is the curvature of the cross-section in the main scanning direction on the center line in the scanning range of the scanning light (beam light) in the main scanning direction, "rs0" is the curvature of the cross-section in the sub-scanning direction on the center position in the scanning range of the scanning light (beam light) in the main scanning direction, "Km" is a conic coefficient, and A3, A4, A6, A8, A10, B1 to B4 are coefficients (aspherical coefficients) set accordingly for each surface.

Since the power in the sub-scanning direction of the first scanning light lens 41 is negative, the size (height) of the second scanning light lens 42 in the sub-scanning direction becomes slightly large. However, the advantage obtained from reducing the size (width) of the second scanning light lens 42 in the main scanning direction is more contributory to downsizing the apparatus.

And also, in the image forming optical equipment 40, the light focus of scanning lights in the main scanning direction is conducted only by the first scanning light lens 41, and therefore, the curvature and the thickness of the first scanning light lens 41 grow large. However, even if the curvature and the thickness of the first scanning light lens 41, which has a small size (width) in the main scanning direction, grow large, it is more contributory to downsizing of the entire apparatus, than the configuration in which a part of the light focus is conducted by the second scanning light lens 42, which has a large size in the main scanning direction (to make the power of the second scanning light lens 42 in the main scanning direction positive).

And also, since the second scanning light lens 42, which mainly adjusts the focal length of scanning lights, is a thin lens of small curvature (the power is negative), the image curvature in the main scanning direction on the surface of the photoreceptor drum 1 can be kept small easily.

FIG. 4 illustrates one example of the embodiment condition of the optical scanner Y.

Additionally, in the conditions shown in FIG. 4, each of the surface numbers "1" to "4" of the scanning light lenses indicates identification numbers sequentially; the surface 41a of the first scanning light lens 41 in the incident side of the scanning light, the surface 41b in the light emission side of the same: the surface 42a in the incident side of the second scanning light lens 42 of the scanning light, and the surface 42b in the light emission side of the same. The aspherical coefficient and the conic coefficient are to be applied to the formula (c1).

Next, as referring to the FIGS. 5 to 26, the appropriate conditions of the two scanning light lenses 41 and 42 are described.

Figure 14:
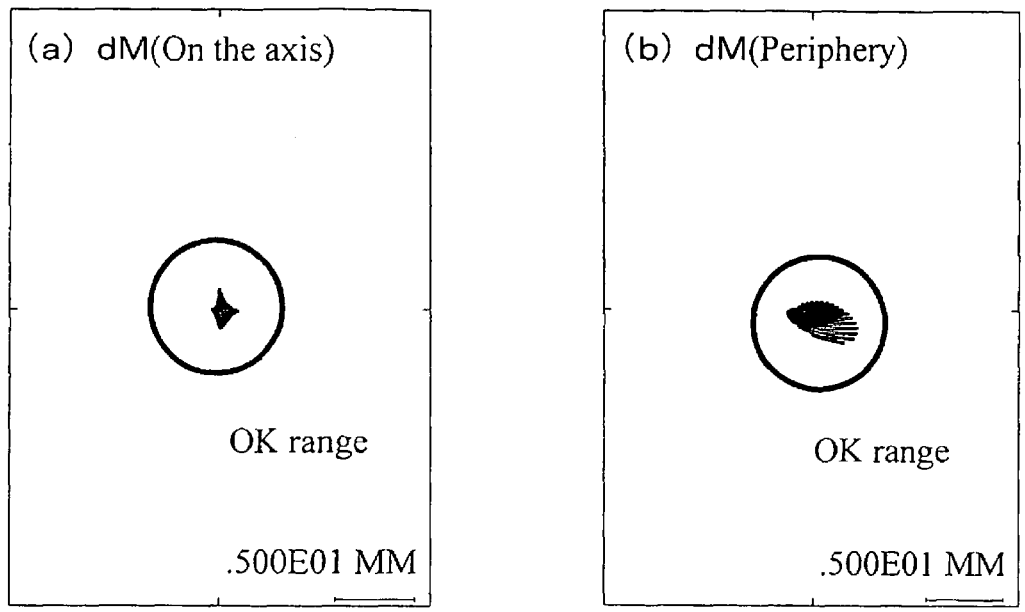
FIG. 14 shows a spot diagram of scanning lights emitted from an optical scanner Y.
Figure 15:
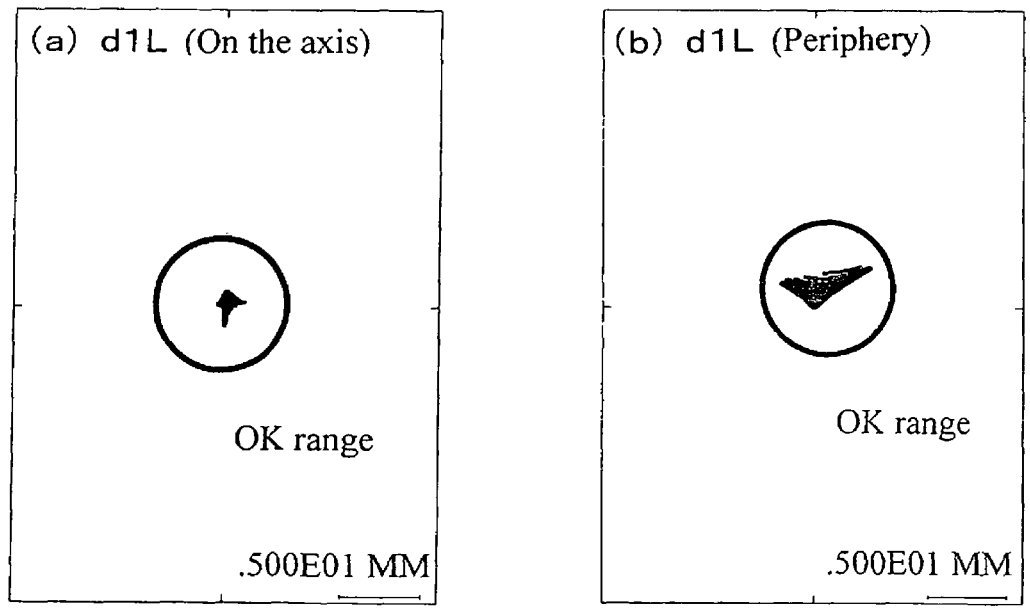
FIG. 15 shows a spot diagram of scanning lights at the time when the first power condition in the main scanning direction of a scanning light lens in an optical scanner Y has been changed (1)
Figure 16:
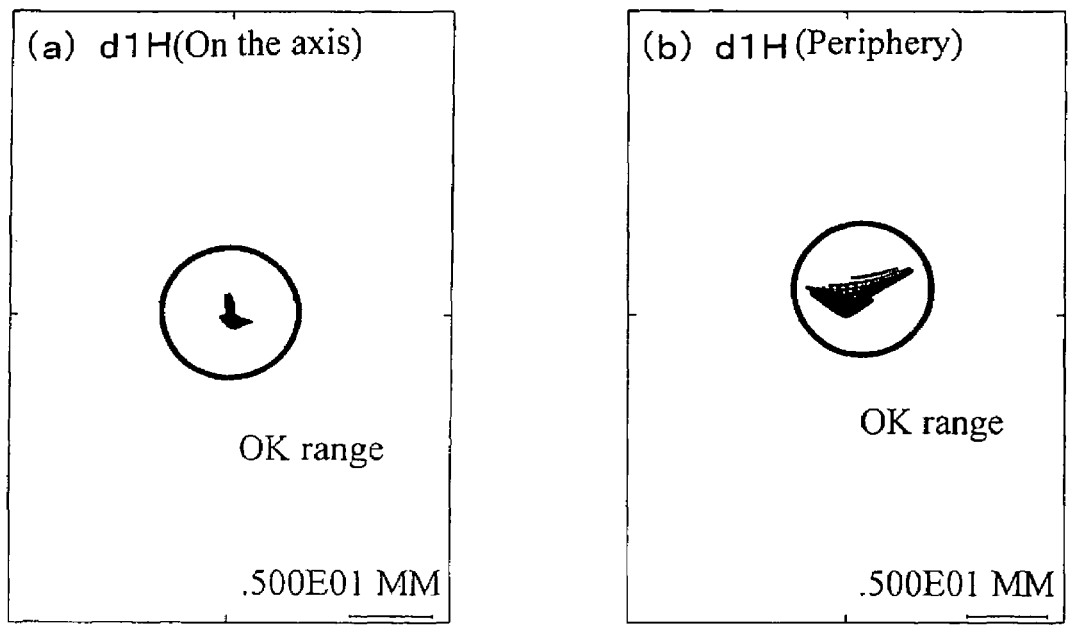
FIG. 16 shows a spot diagram of scanning lights at the time when the first power condition in the main scanning direction of a scanning light lens in an optical scanner Y has been changed (2)

FIG. 14 shows a spot diagram (scatter of the spot center positions on the surface of the photoreceptor drum 1) of the scanning light in the optical scanner Y, which fulfills the embodiment conditions indicated in FIG. 4.

And also, FIGS. 5 to 7 and FIGS. 15 to 18 are graphs indicating: the linearity of the scanning light, the image curvature in the main scanning direction (main scanning image curvature), the image curvature in the sub-scanning direction (sub-scanning image curvature), and the scatter of the spot center positions, at the time when, based on the embodiment conditions shown in FIG. 4 as a reference, the later described conditions regarding the power of two scanning light lenses 41 and 42 in the main scanning direction (hereinafter referred to as "first power condition in the main scanning direction") have been changed.

And also, FIGS. 8 to 10 and FIGS. 19 to 22 are graphs indicating: the linearity of the scanning light, the image curvature in the main scanning direction (main scanning image curvature), the image curvature in the sub-scanning direction (sub-scanning image curvature), and the scatter of the spot center positions, at the time when, based on the embodiment conditions shown in FIG. 4 as a reference, the later described conditions regarding the power of two scanning light lenses 41 and 42 in the main scanning direction (hereinafter referred to as "second power condition in the main scanning direction") have been changed.

And also, FIGS. 11 to 13 and FIGS. 23 to 26 are graphs indicating: the linearity of the scanning light (a relative deviation with respect to an ideal image height), the image curvature in the main scanning direction (main scanning image curvature), the image curvature in the sub-scanning direction (sub-scanning image curvature), and the scatter of the spot center positions, at the time when, based on the embodiment conditions shown in FIG. 4 as a reference, the later described conditions regarding the power of two scanning light lenses 41 and 42 in the sub-scanning direction (hereinafter referred to as "power condition in the sub-scanning direction") have been changed. Additionally, the linearity of the scanning light represents the deviation amount of the actual scanning position with respect to the scanning position under the reference condition (ideal image height), in which the scanning light is scanned in the main scanning direction at a target constant speed on the surface of the photoreceptor drum 1 (a linear state).

Additionally, in the FIGS. 5 to 13, the horizontal axis indicates the image height (the position in the main scanning direction on the basis of the center of the main scanning range). And also, the ranges indicated by "OK range" in the FIGS. 5 to 26 are allowable ranges, where the image quality is not deteriorated to the level of visible deficiency even when the deviation of the geometric optical aberration of the beam light (scanning light) for writing an electrostatic latent image with respect to the ideal state is occurred within the range. In addition, (a) "On the axis" means the center position in the main scanning range, and (b) "Periphery" means the position near a start of scanning position (or an end of scanning position) within the main scanning range.

Hereinafter, a ".phi.tm" represents the power in the main scanning direction of the image forming optical equipment 40 which combines the first scanning light lens 41 and the second scanning light lens 42, a ".phi.1m" represents the power in the main scanning direction of the first scanning light lens 41, a ".phi.2m" represents the power in the main scanning direction of the second scanning light lens 42, a ".phi.1s" represents the power in the sub-scanning direction of the first scanning light lens 41, and a ".phi.2s" represents the power in the sub-scanning direction of the second scanning light lens 42.

In what follows, the appropriate range of the first power condition in the main scanning direction is described.

The first power condition in the main scanning direction is a condition indicating how [.phi.2m/.phi.tm] is set.

More specifically, the first power condition in the main scanning direction: d1M under the embodiment condition shown in FIG. 4 is [.phi.2m/.phi.tm=−0.75]. In FIGS. 5 to 7 and FIGS. 15 to 18, as the first power condition in the main scanning direction other than the above, conditions are shown: a "d1L'" of [.phi.2m/.phi.tm=−1.22], a "d1L" of [.phi.2m/.phi.tm=−1.20], a "d1H" of [.phi.2m/.phi.tm=−0.48], and a "d1H'" of [.phi.2m/.phi.tm=−0.50].

Figure 6:
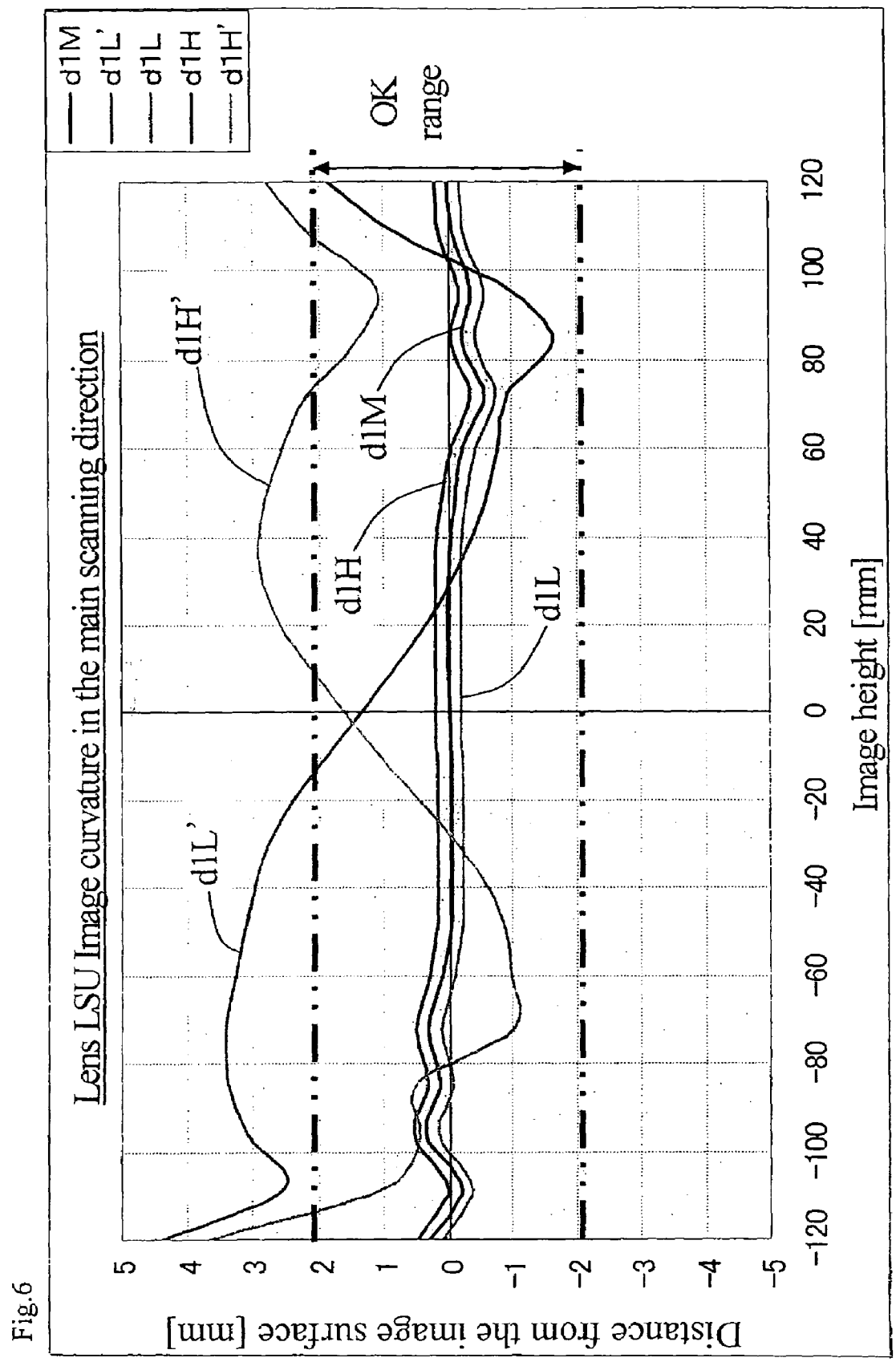
FIG. 6 shows a graph indicating an experimental result evaluating the effect affecting an image curvature in the main scanning direction of a scanning light lens in an optical scanner Y, at the time when the first power condition in the main scanning direction of the scanning light lens has been changed.
Figure 7:
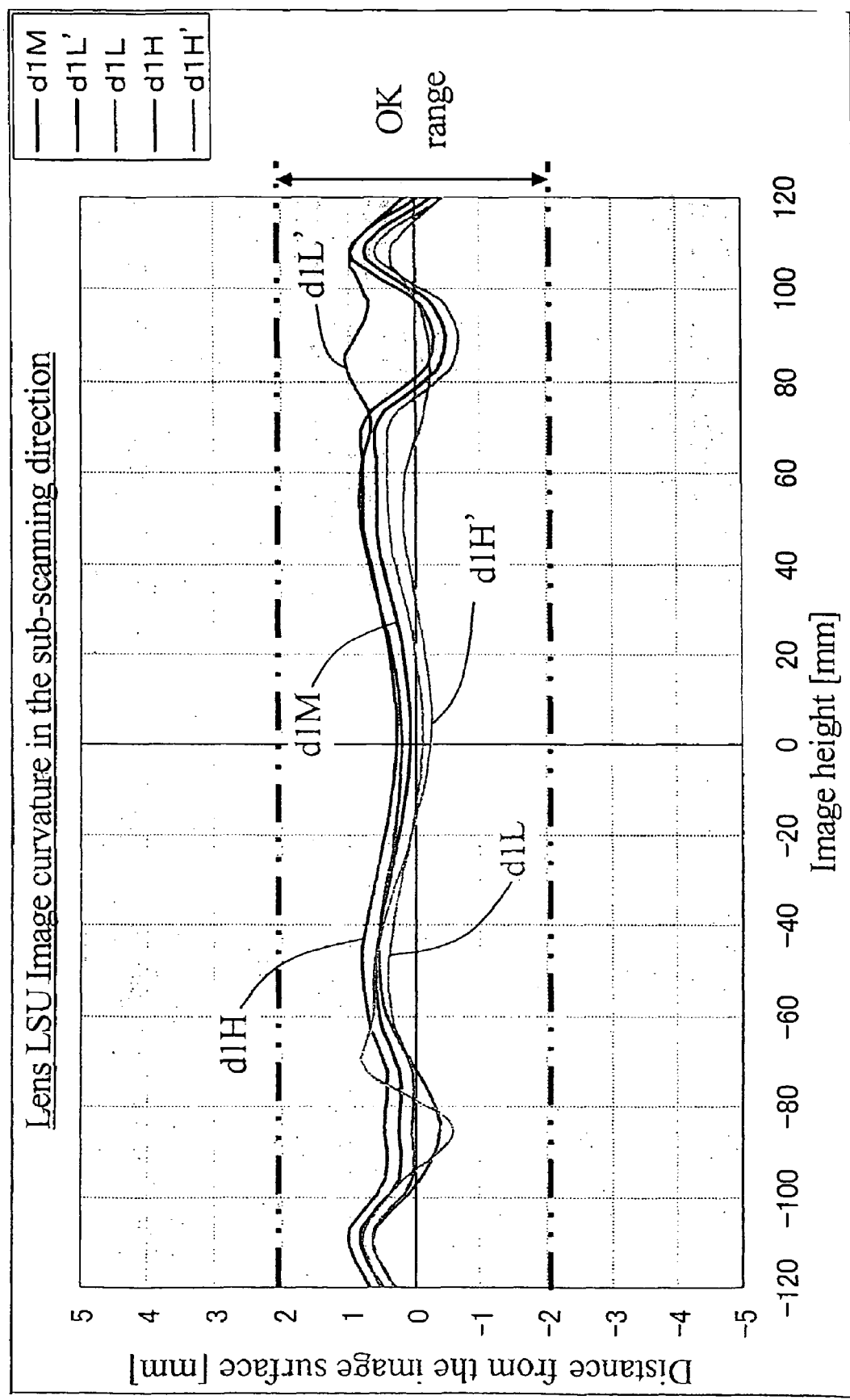
FIG. 7 shows a graph indicating an experimental result evaluating the effect affecting an image curvature in the sub-scanning direction of a scanning light lens in an optical scanner Y, at the time when the first power condition in the main scanning direction of the scanning light lens has been changed.

As can be seen from the graph in FIG. 6, when the first power condition in the main scanning direction is [.phi.2m/.phi.tm<−1.20] or [.phi.2m/.phi.tm>−0.48] (see the graphs of the conditions: d1L' and d1H'), the image curvature of scanning lights in the main scanning direction on the surface of the photoreceptor drum 1 grows large, going beyond the appropriate range (OK range).

Figure 17:
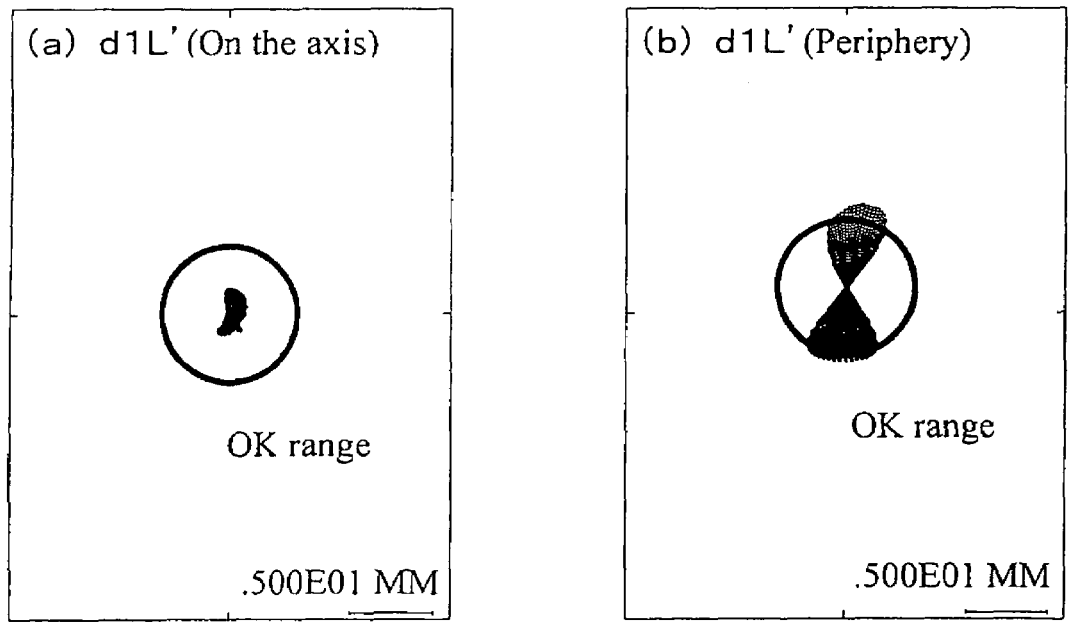
FIG. 17 shows a spot diagram of scanning lights at the time when the first power condition in the main scanning direction of a scanning light lens in an optical scanner Y has been changed (3)
Figure 18:
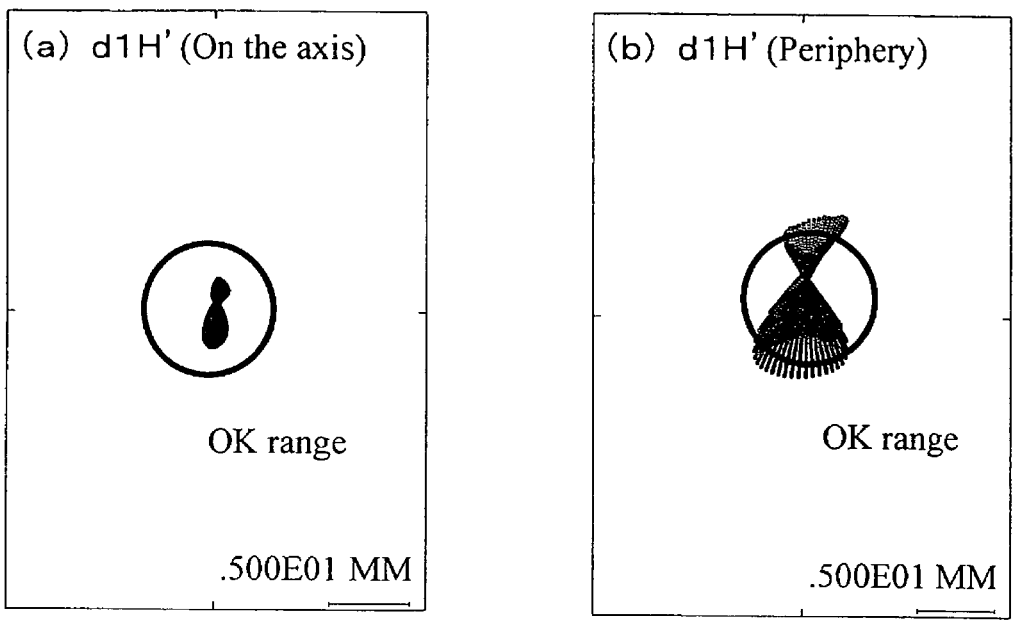
FIG. 18 shows a spot diagram of scanning lights at the time when the first power condition in the main scanning direction of a scanning light lens in an optical scanner Y has been changed (4)
Figure 19:
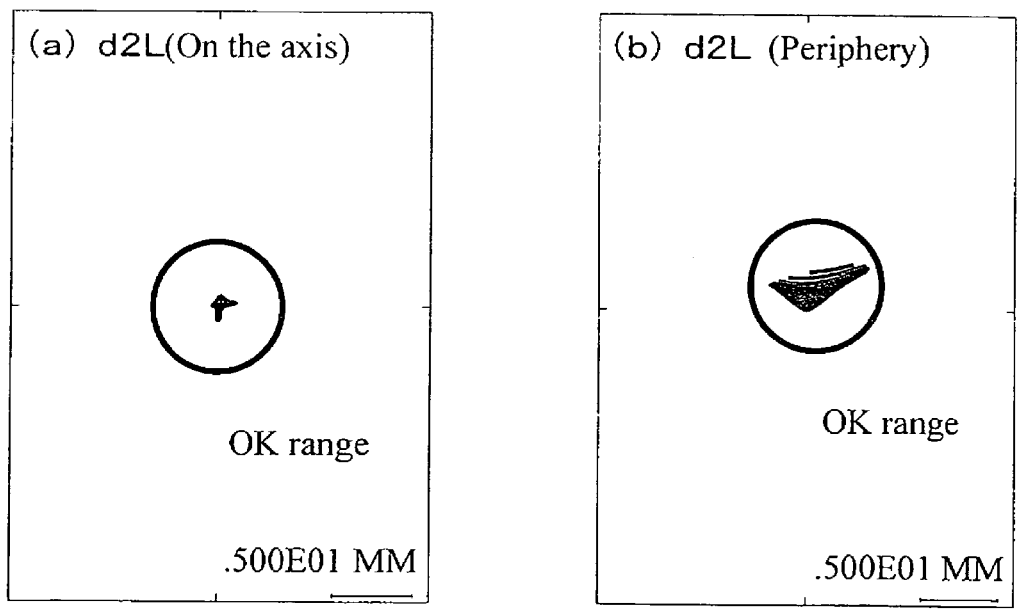
FIG. 19 shows a spot diagram of scanning lights at the time when the second power condition in the main scanning direction of a scanning light lens in an optical scanner Y has been changed (1)
Figure 20:
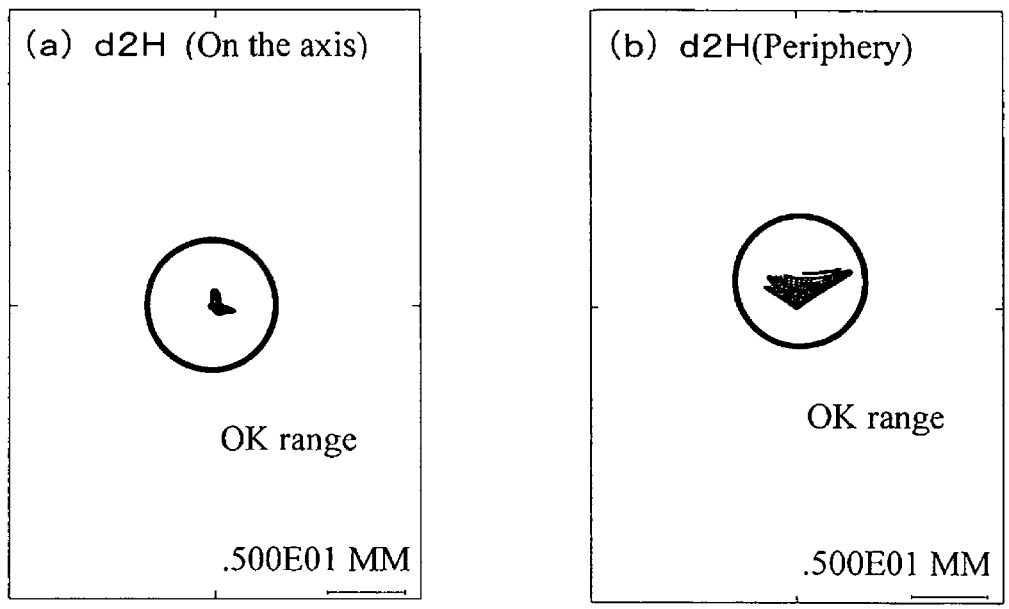
FIG. 20 shows a spot diagram of scanning lights at the time when the second power condition in the main scanning direction of a scanning light lens in an optical scanner Y has been changed (2)

As can be seen from FIGS. 17 and 18, when the first power condition in the main scanning direction is [.phi.2m/.phi.tm<−1.20] or [.phi.2m/.phi.tm>−0.48] (see the graphs of the conditions: d1L' and d1H'), the scatter of the spot positions of scanning lights on the surface of the photoreceptor drum 1 grows large, going beyond the appropriate range (OK range)).

On the other hand, as can be seen from the FIGS. 5 to 7 and FIGS. 14 to 16, when the first power condition in the main scanning direction fulfills the following inequality (a1), the linearity of the scanning light, the image curvature in the main scanning direction, the image curvature in the sub-scanning direction, and the scatter of the spot positions, on the surface of the photoreceptor drum 1 may all be within the appropriate range.

$$-1.20 \leq .phi.2m/.phi.tm \leq -0.48 \quad (a1)$$

Next, the appropriate range of the second power condition in the main scanning direction is described.

The second power condition in the main scanning direction is a condition indicating how [.phi.1m/.phi.tm] is set.

More specifically, the second power condition in the main scanning direction: d2M under the embodiment condition shown in FIG. 4 is [.phi.1m/.phi.tm=1.65]. And also, in FIGS. 8 to 10 and FIGS. 19 to 22, as the second power condition in the main scanning direction other than the above, conditions are shown: a "d2L'" of [.phi.1m/.phi.tm=1.30], a "d2L" of [.phi.1m/.phi.tm=1.32], a "d2H" of [.phi.1m/.phi.tm=2.00], and a "d2H'" of [.phi.1m/.phi.tm=2.02].

Figure 8:
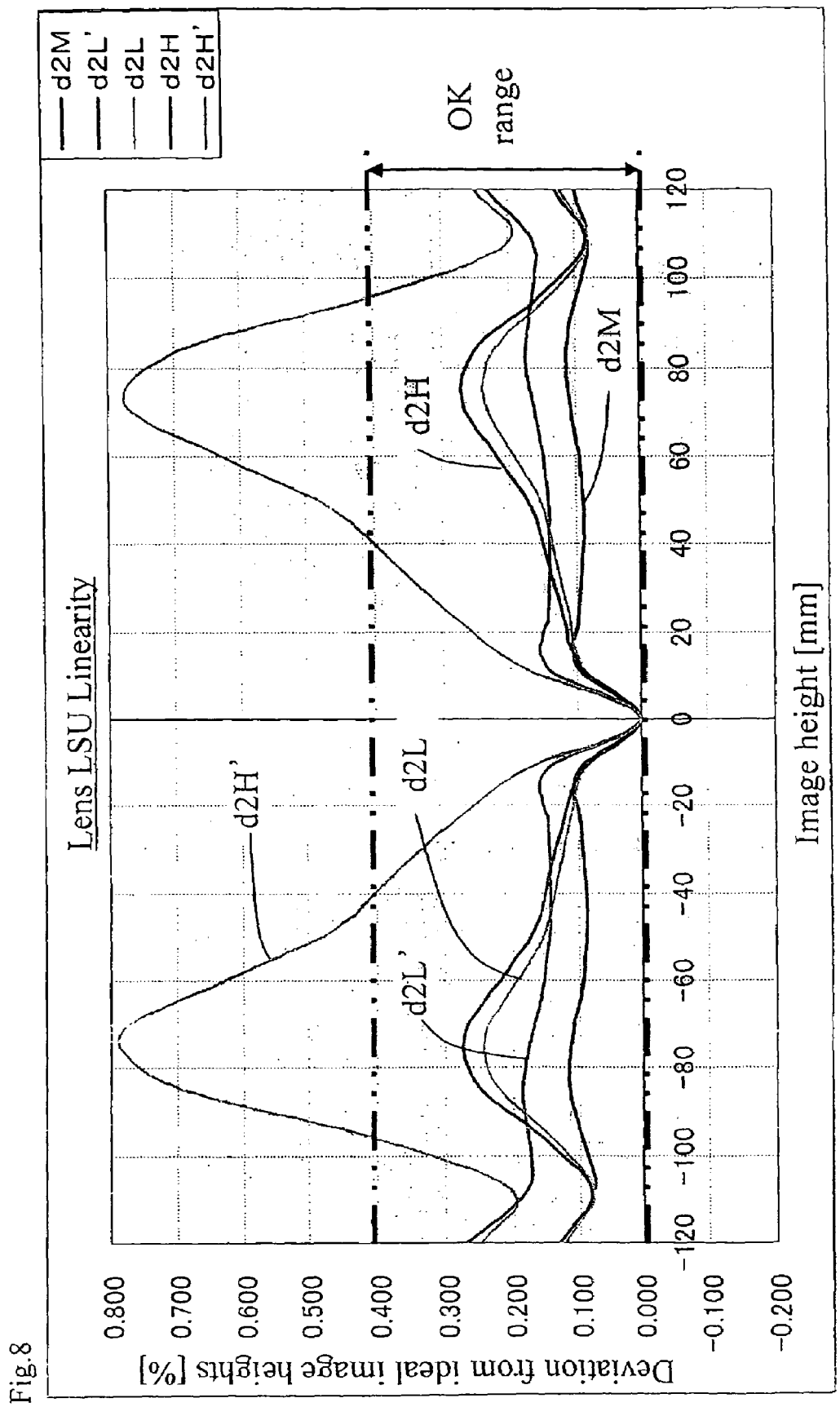
FIG. 8 shows a graph indicating an experimental result evaluating the effect affecting a linearity of a scanning light of a scanning light lens in an optical scanner Y, at the time when the second power condition in the main scanning direction of the scanning light lens has been changed.

As can be seen from the graph in FIG. 8, when the second power condition in the main scanning direction is [.phi.1m/.phi.tm>2.00] (see the graph of the condition d2H'), the linearity of scanning lights on the surface of the photoreceptor drum 1 deteriorates, going beyond the appropriate range (OK range).

Figure 9:
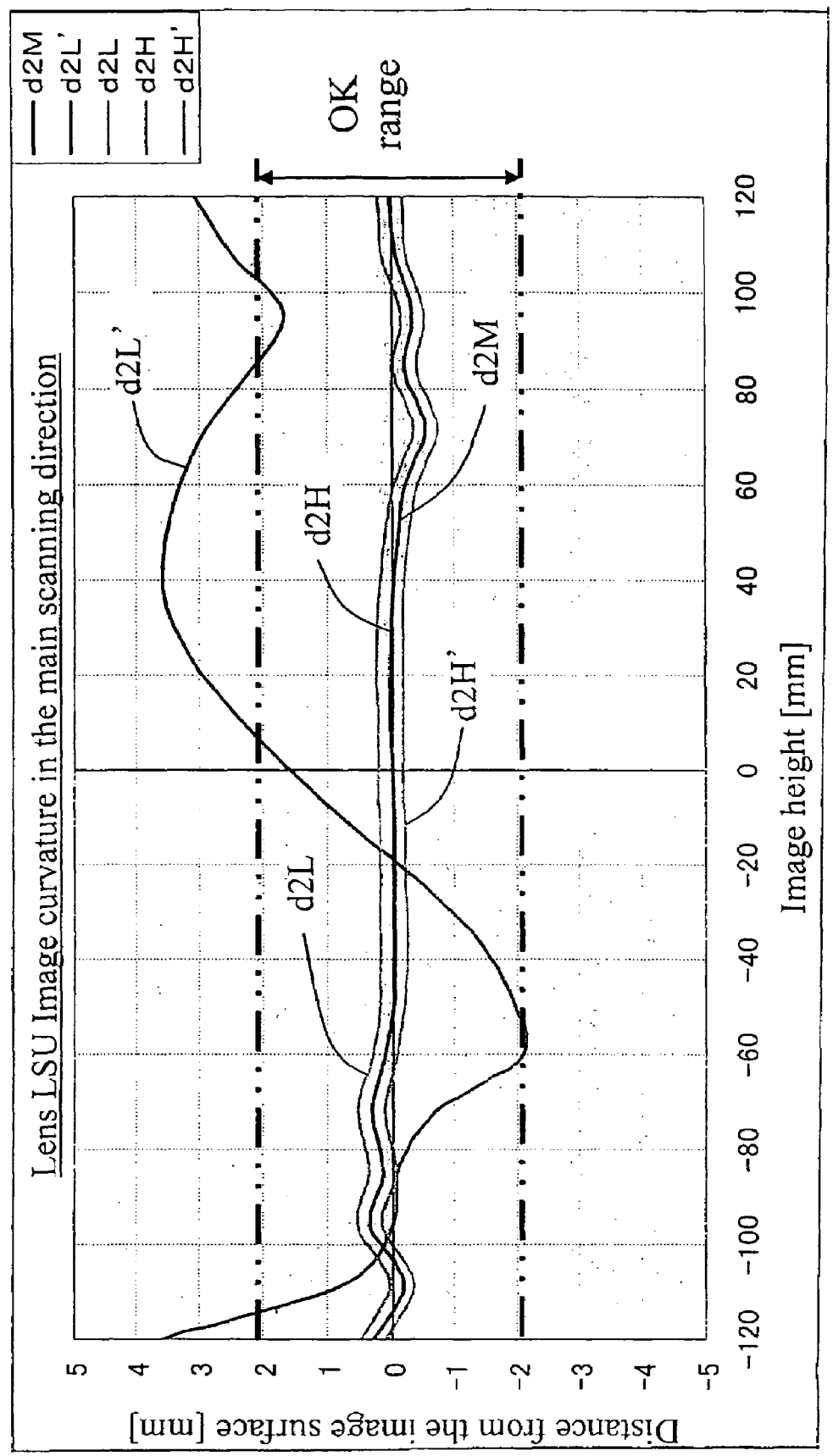
FIG. 9 shows a graph indicating an experimental result evaluating the effect affecting an image curvature in the main scanning direction of a scanning light lens in an optical scanner Y, at the time when the second power condition in the main scanning direction of the scanning light lens has been changed.
Figure 10:
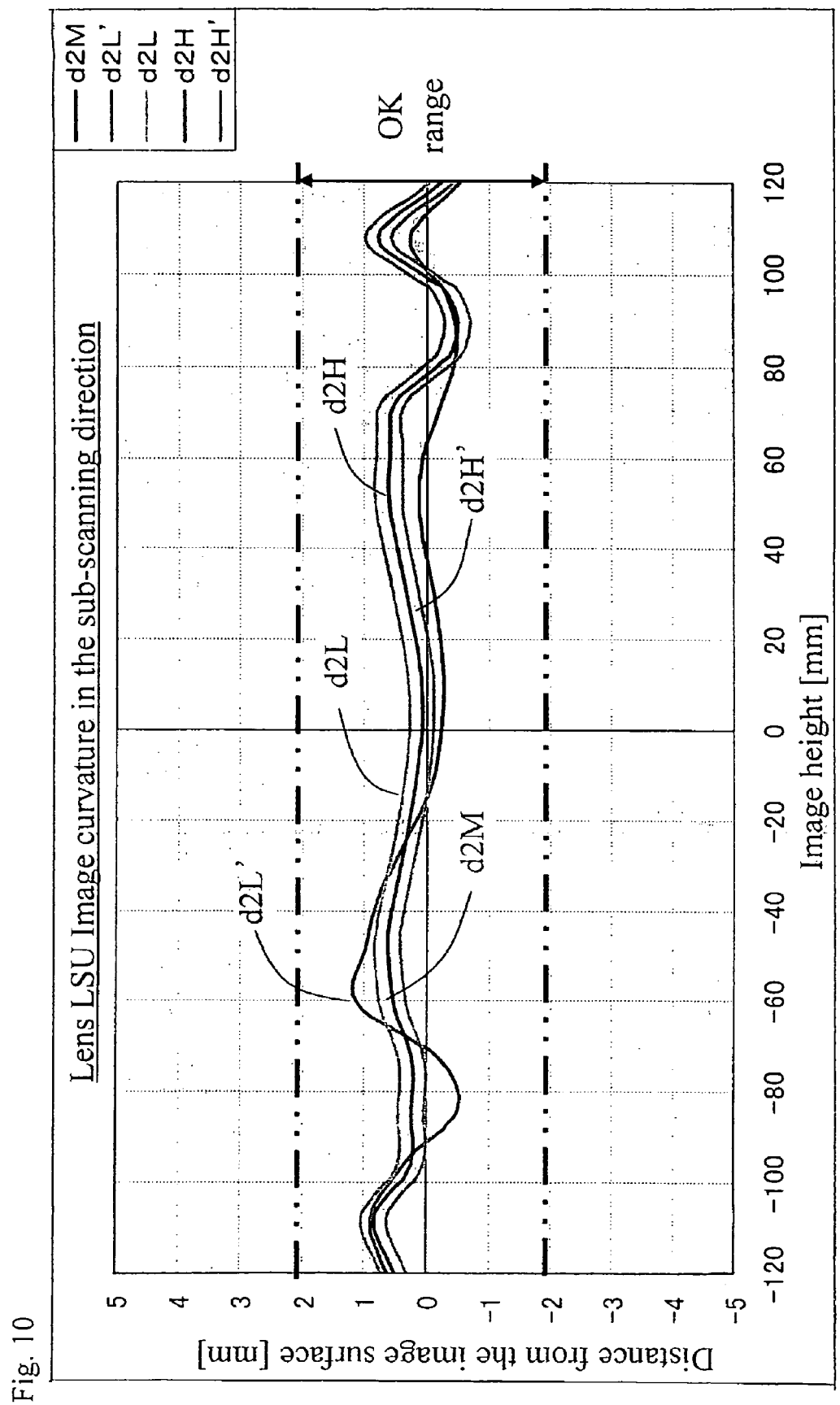
FIG. 10 shows a graph indicating an experimental result evaluating the effect affecting an image curvature in the sub-scanning direction of a scanning light lens in an optical scanner Y, at the time when the second power condition in the main scanning direction of the scanning light lens has been changed.
Figure 11:
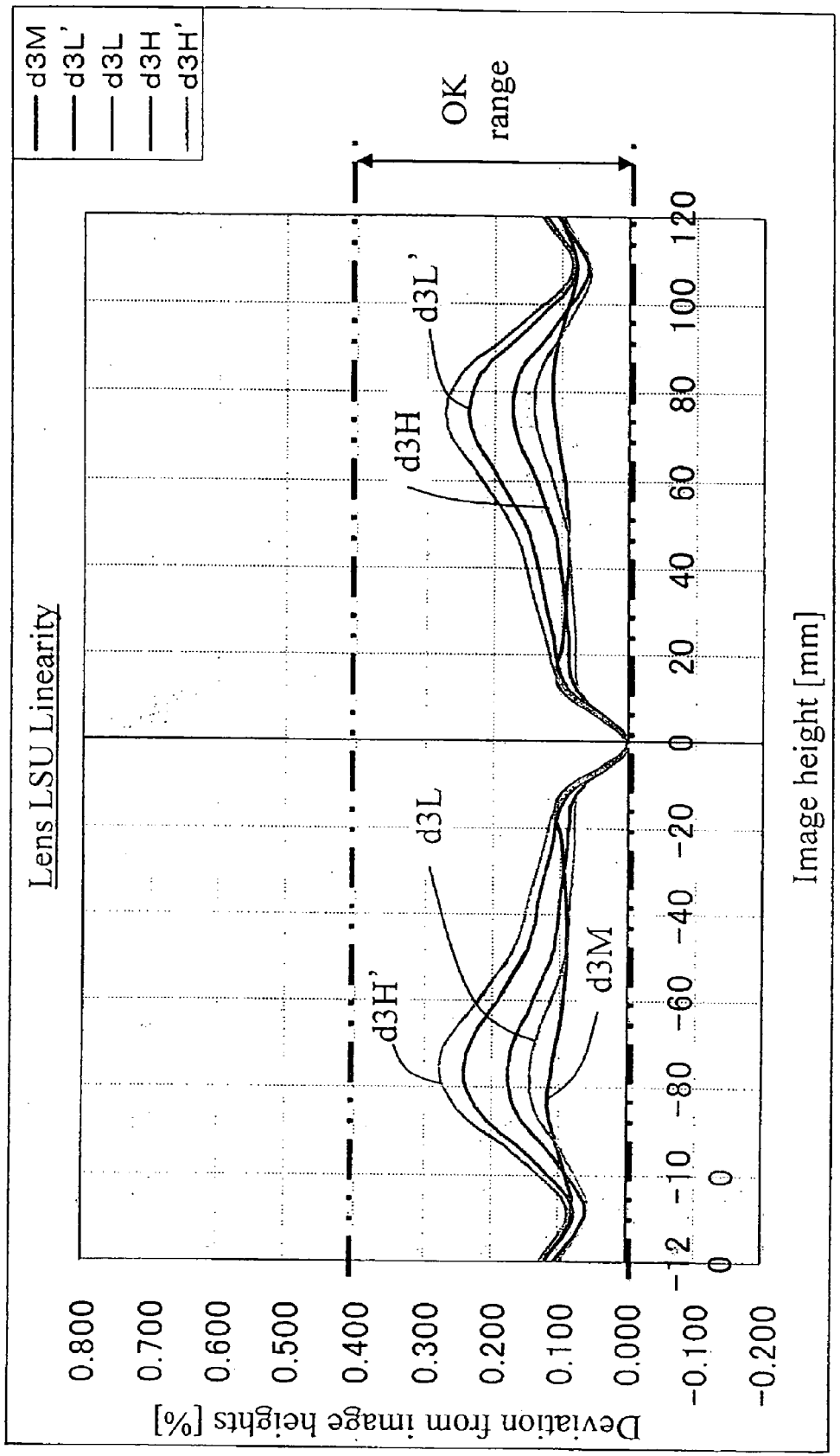
FIG. 11 shows a graph indicating an experimental result evaluating the effect affecting a linearity of a scanning light of a scanning light lens in an optical scanner Y, at the time when the power condition in the sub-scanning direction of the scanning light lens has been changed.
Figure 12:
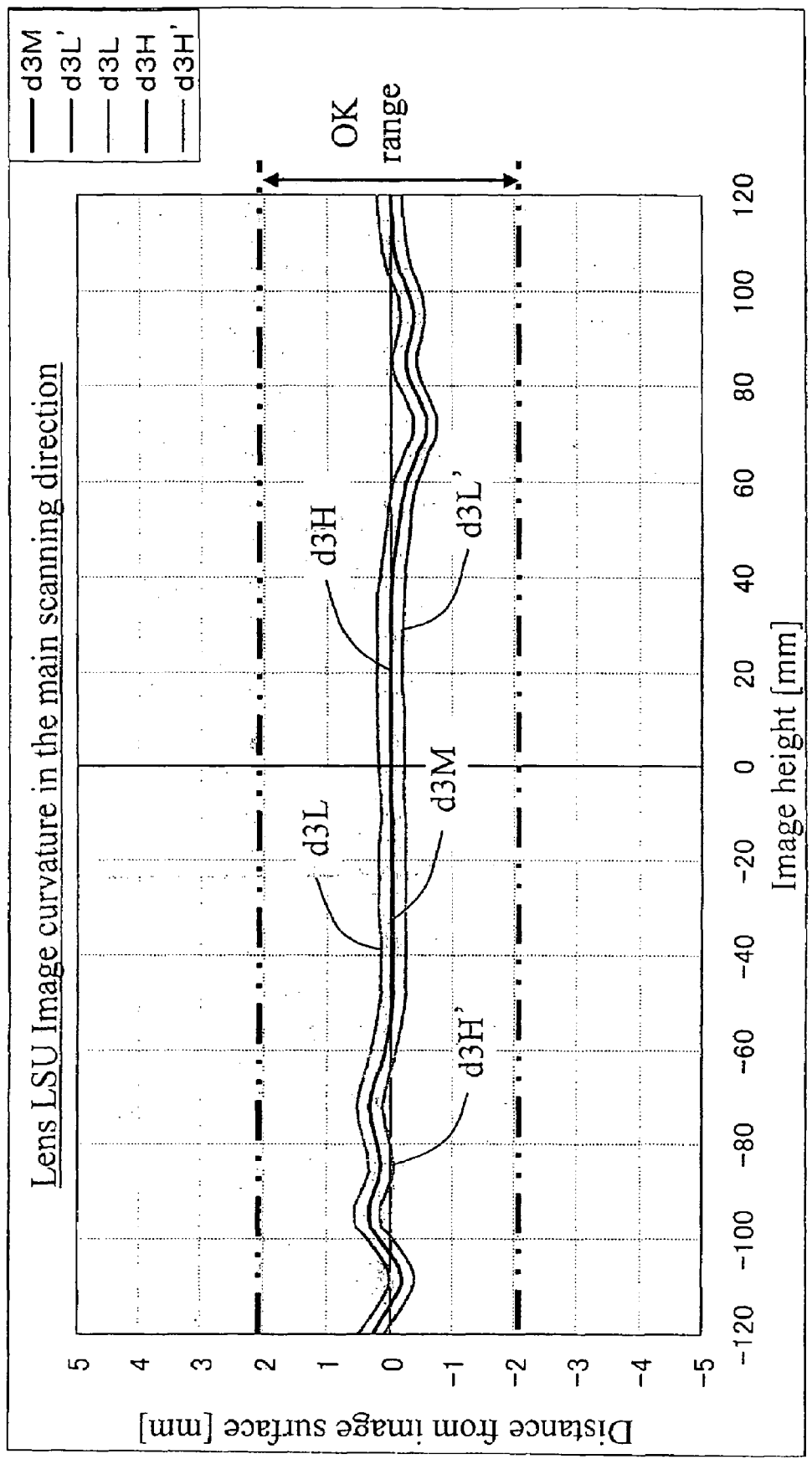
FIG. 12 shows a graph indicating an experimental result evaluating the effect affecting an image curvature in the main scanning direction of a scanning light lens in an optical scanner Y, at the time when the power condition in the sub-scanning direction of the scanning light lens has been changed.

And also, as can be seen from the graph in FIG. 9, when the second power condition in the main scanning direction is [.phi.1m/.phi.tm<1.32] (see the graph of the condition d2L'), the image curvature of the main scanning light in the main scanning direction on the surface of the photoreceptor drum 1 grows large, going beyond the appropriate range (OK range).

Figure 21:
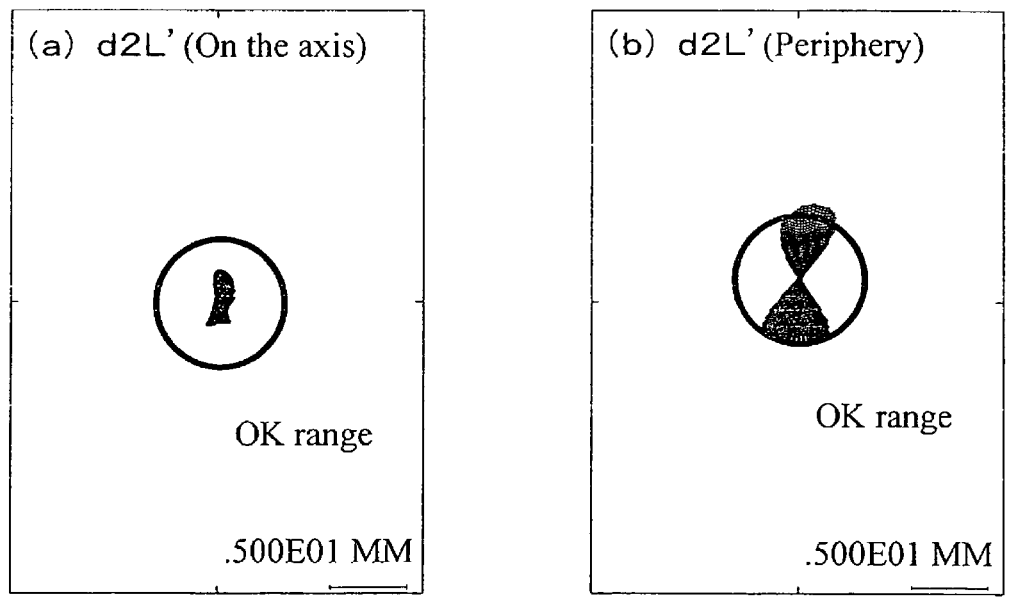
FIG. 21 shows a spot diagram of scanning lights at the time when the second power condition in the main scanning direction of a scanning light lens in an optical scanner Y has been changed (3)
Figure 22:
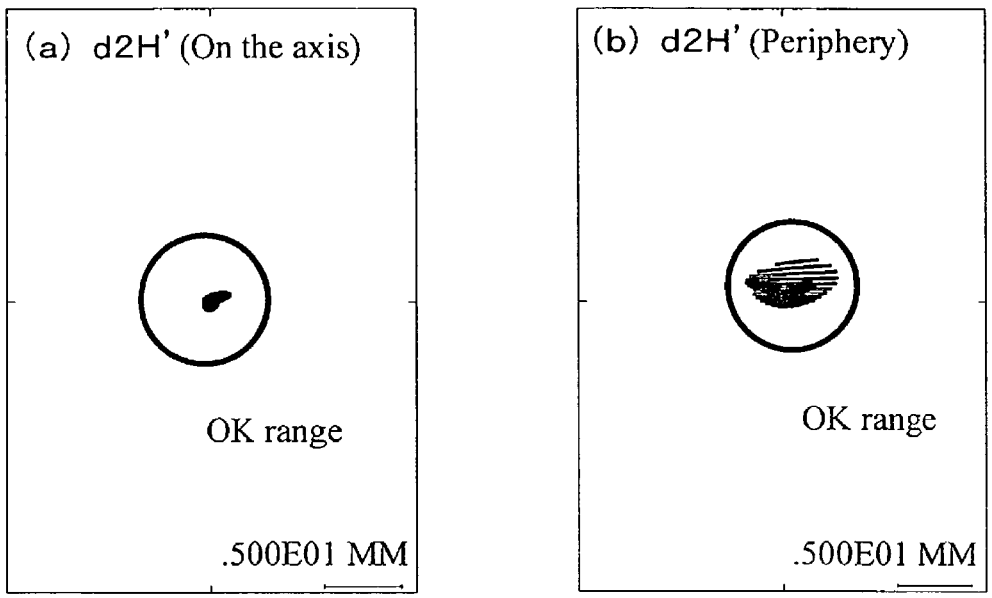
FIG. 22 shows a spot diagram of scanning lights at the time when the second power condition in the main scanning direction of a scanning light lens in an optical scanner Y has been changed (4)
Figure 23:
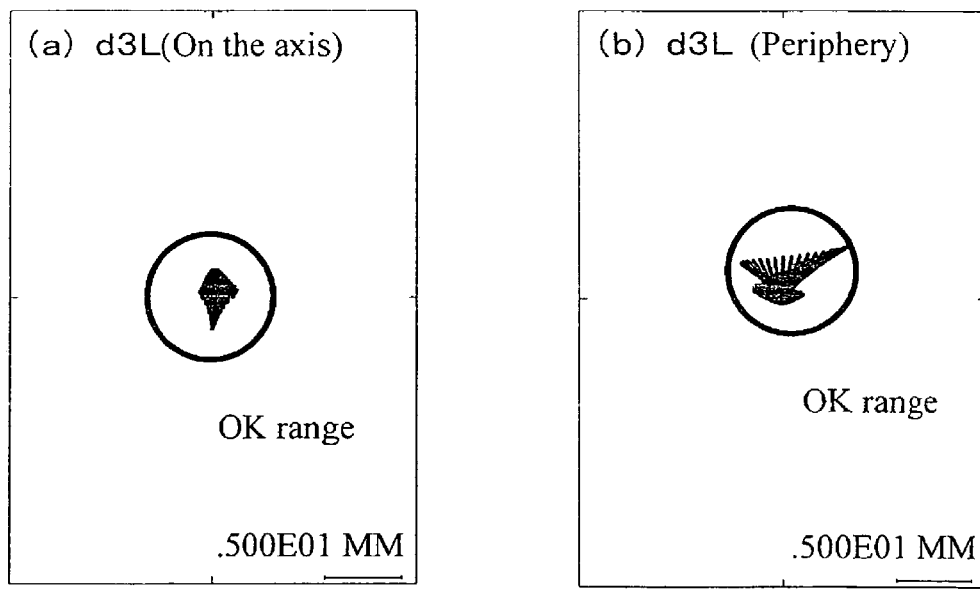
FIG. 23 shows a spot diagram of scanning lights at the time when the power condition in the sub-scanning direction of a scanning light lens in an optical scanner Y has been changed (1)

Furthermore, as can be seen from the graph in FIG. 21, when the second power condition in the main scanning direction is [.phi.1m/.phi.tm<1.32] (see the graph of the condition d2L'), the scatter of spot positions of scanning lights on the surface of the photoreceptor drum 1 grows large, going beyond the appropriate range (OK range).

On the other hand, as can be seen from the FIGS. 8 to 10 and FIGS. 19 to 22, when the second power condition in the main scanning direction fulfills the following inequality (a2), the linearity of the scanning light, the image curvature in the main scanning direction, the image curvature in the sub-scanning direction, and the scatter of the spot positions, on the surface of the photoreceptor drum 1 may all be within the appropriate range.

$$1.32 \leq .phi.1m/.phi.tm \leq 2.00 \quad (a2)$$

In what follows, the appropriate range of the power condition in the sub-scanning direction is described.

The power condition in the sub-scanning direction is a condition indicating how [.phi.1m/.phi.2s] is set.

More specifically, the power condition in the sub-scanning direction: d3M under the embodiment condition shown in FIG. 4 is [.phi.1m/.phi.2s=−2.52]. And also, in FIGS. 11 to 13 and FIGS. 23 to 26, as the power condition in the sub-scanning direction other than the above, conditions are shown: a "d3L'" of [.phi.1s/.phi.2s=−3.00], a "d3L" of [.phi.1s/.phi.2s=−2.98], a "d3H" of [.phi.1s/.phi.2s=−0.81], and a "d3H'" of [.phi.1s/.phi.2s=−0.81].

Figure 13:
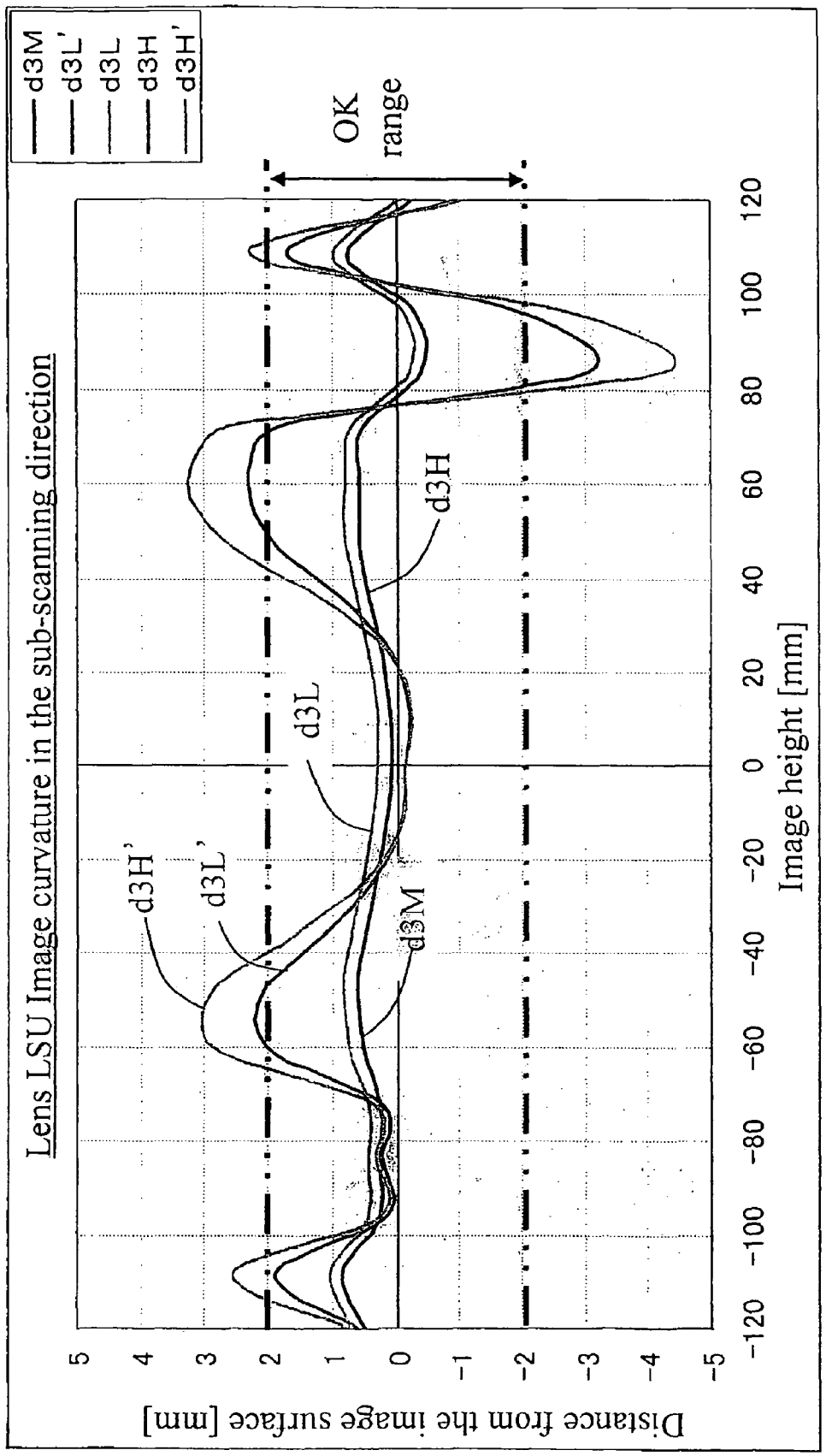
FIG. 13 shows a graph indicating an experimental result evaluating the effect affecting an image curvature in the sub-scanning direction of a scanning light lens in an optical scanner Y, at the time when the power condition in the sub-scanning direction of the scanning light lens has been changed.

As can be seen from the graph in FIG. 13, when the power condition in the sub-scanning direction is [.phi.1s/.phi.2s<−2.98] or [.phi.1s/.phi.2s>−0.81] (see the graphs of the conditions: d3L' and d3H'), the image curvature of the main scanning light in the sub-scanning direction on the surface of the photoreceptor drum 1 grows large, going beyond the appropriate range (OK range).

Figure 25:
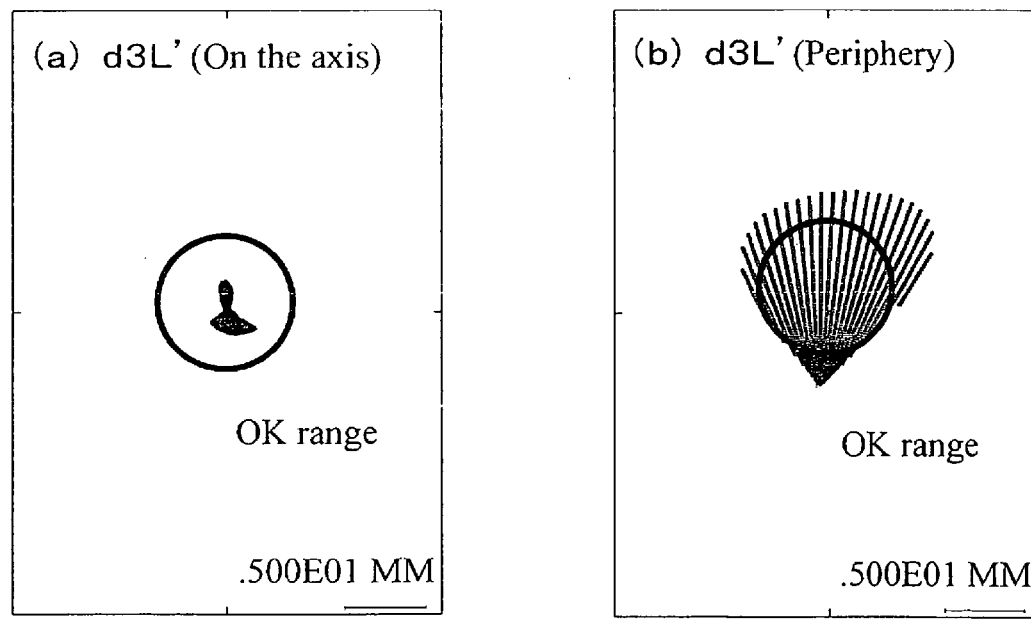
FIG. 25 shows a spot diagram of scanning lights at the time when the power condition in the sub-scanning direction of a scanning light lens in an optical scanner Y has been changed (3)

Furthermore, as can be seen from FIGS. 25 and 26, when the power condition in the sub-scanning direction is [.phi.1s/.phi.2s<−2.98] or [.phi.1s/.phi.2s>−0.81] (see the graphs of the conditions: d3L' and d3H'), the scatter of the spot positions of scanning lights on the surface of the photoreceptor drum 1 grows large, going beyond the appropriate range (OK range).

On the other hand, as can be seen from the FIGS. 11 to 13 and FIGS. 14 and 23 to 16, when the power condition in the sub-scanning direction fulfills the following inequality (b1), the linearity of the scanning light, the image curvature in the main scanning direction, the image curvature in the sub-scanning direction, and the scatter of the spot positions, on the surface of the photoreceptor drum 1 may all be within the appropriate range.

$$-2.98 \leq .phi.1s/.phi.2s \leq -0.81 \quad (b1)$$

Figure 24:
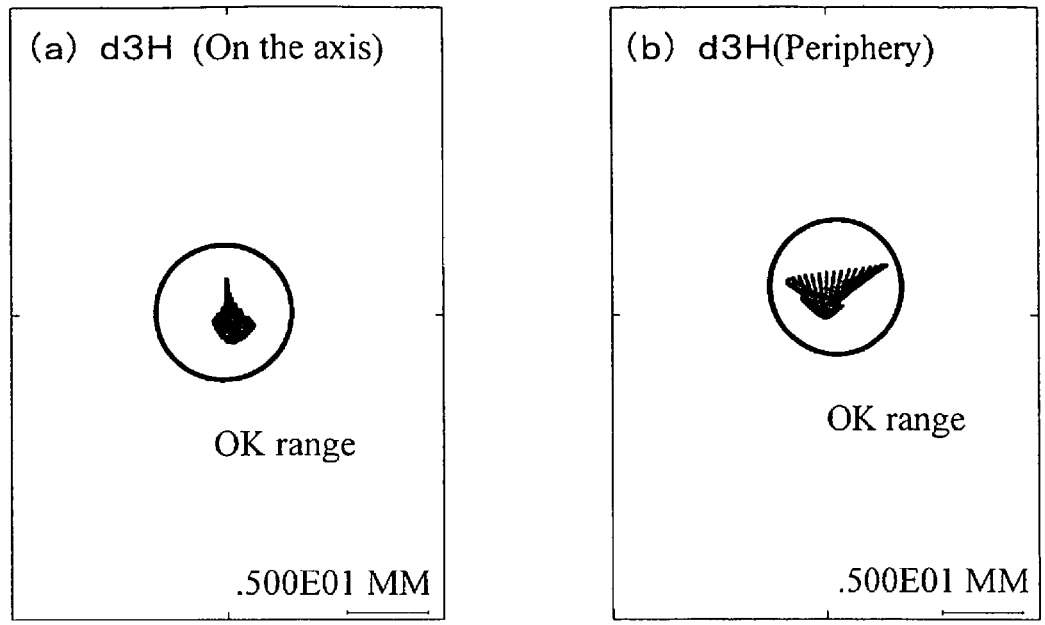
FIG. 24 shows a spot diagram of scanning lights at the time when the power condition in the sub-scanning direction of a scanning light lens in an optical scanner Y has been changed (2)

The large scatter of the spot center positions in FIGS. 24 to 26 are caused from the unevenness of the aberration of scanning lights.

As described in the above, when each power in the main scanning direction of the first scanning light lens 41 and the second scanning light lens 42 in the optical scanner Y fulfills at least any one of the above-mentioned inequalities (a1) or (a2), the image curvature in the main scanning direction as well as the unevenness (linearity) of the scanning speed of scanning lights on the surface of the photoreceptor drum 1 (a surface to be scanned) can be kept small to a level sufficient to provide image quality by performing the writing of an electrostatic latent image with the scanning lights at the time.

Similarly, when each power in the sub-scanning direction of the first scanning light lens 41 and the second scanning light lens 42 fulfills the above-mentioned inequality (b1), the image curvature in the sub-scanning direction on the surface of the photoreceptor drum 1 can be kept small to a level sufficient to provide image quality when performing the writing of an electrostatic latent image with the scanning lights at the time.

Next, the action of the diffraction optical element 24 is described.

According to the use condition, the oscillation wavelength of the beam light emitted from the light source 10 for such as a semiconductor laser is fluctuated. And also, the refractive index of the first scanning light lens 41 and the second scanning light lens 42 varies unignorably according to the ambient temperature fluctuation. This fluctuation of the use condition of the optical scanner Y causes the focus shift (out-of-focus) of scanning lights to occur on the surface of the photoreceptor drum 1.

In response, when a fluctuation of the oscillation wavelength of the beam light emitted from the light source 10 or a fluctuation of the ambient temperature has occurred, the diffraction optical element 24 disposed in the light path of the beam light extending from the collimator lens 21 to the polygon mirror 30 can vary the focal length of the beam light having passed through the cylindrical lens 23, in the direction negating the focus shift (out of focus) of scanning lights caused from such fluctuation.

Particularly, since the first scanning light lens 41 and the second scanning light lens 42 are made of resin, compared to the configuration using a glass lens for these lenses, the diffraction optical element 24 provides a noteworthy effect of focus correction due to a relatively large change in the refractive index (in short, the focus shift of a scanning light) caused by a fluctuation of ambient temperature.

The present invention is applicable to an optical scanner and a image forming apparatus provided with the same.

What is claimed is:

1. An optical scanner comprising:
an optical scanning means for reflecting on a reflecting surface a light flux emitted from a light source, while at the same time, scanning said light flux in a linear direction as a main scanning direction toward a prescribed surface to be scanned; and
an image forming means disposed in between the optical scanning means and the surface to be scanned for forming an image on the surface to be scanned with a scanning light scanned by the optical scanning means, while at the same time, keeping a scanning speed of the scanning light nearly-constant on the surface to be scanned; and
wherein, the image forming means comprises:
a first lens having a positive power in the main scanning direction and a negative power in the sub-scanning direction, that is orthogonal to the main scanning direction; and
a second lens disposed in a closer position to the surface to be scanned than the first lens, having a negative power in the main scanning direction and a positive power in the sub-scanning direction; and
wherein the optical scanner fulfills a condition: $-1.2 \leq \phi 2m/\phi tm \leq -0.48$ when a power of the image forming means, that combines the first lens and the second lens, in the main scanning direction is $\phi tm$, and a power of the second lens in the main scanning direction is $\phi 2m$.

2. An optical scanner comprising:
an optical scanning means for reflecting on a reflecting surface a light flux emitted from a light source, while at the same time, scanning said light flux in a linear direction as a main scanning direction toward a prescribed surface to be scanned; and
an image forming means disposed in between the optical scanning means and the surface to be scanned for forming an image on the surface to be scanned with a scanning light scanned by the optical scanning means, while at the same time, keeping a scanning speed of the scanning light nearly-constant on the surface to be scanned; and
wherein, the image forming means comprises:
a first lens having a positive power in the main scanning direction and a negative power in the sub-scanning direction, that is orthogonal to the main scanning direction; and
a second lens disposed in a closer position to the surface to be scanned than the first lens, having a negative power in the main scanning direction and a positive power in the sub-scanning direction; and
wherein the optical scanner fulfills a condition: $1.32 \leq \phi 1m/\phi tm \leq 2.00$ when a power of the image forming means, that combines the first lens and the second lens, in the main scanning direction is $\phi tm$, and a power of the first lens in the main scanning direction is $\phi 1m$.

3. An optical scanner according to claim 1, which fulfills a condition: $-2.98 \leq \phi1s/\phi2s \leq -0.81$ when a power of the first lens in the sub-scanning direction is $\phi1s$, and the power of the second lens in the sub-scanning direction is $\phi2s$.

4. An optical scanner according to claim 2, which fulfills a condition: $-2.98 \leq \phi1s/\phi2s \leq -0.81$ when a power of the first lens in the sub-scanning direction is $\phi1s$, and the power of the second lens in the sub-scanning direction is $\phi2s$.

5. An optical scanner according to claim 1, comprising: a collimator lens, an aperture, and a cylindrical lens which are disposed sequentially from the light source side in the advancing path of the light flux in between the light source and the optical scanning means, and furthermore, a diffraction optical element disposed in a light path of the light flux from passing through the collimator lens and reaching to the optical scanning means.

6. An optical scanner according to claim 2, comprising: a collimator lens, an aperture, and a cylindrical lens which are disposed sequentially from the light source side in the advancing path of the light flux in between the light source and the optical scanning means, and further, a diffraction optical element disposed in a light path of the light flux from passing through the collimator lens and reaching to the optical scanning means.

7. An optical scanner according to claim 5, wherein the diffraction optical element is provided on the surface of the cylindrical lens.

8. An optical scanner according to claim 6, wherein the diffraction optical element is provided on the surface of the cylindrical lens.

9. An optical scanner according to claim 1, wherein the first and second lenses are made of resin.

10. An image forming apparatus comprising an optical scanner for scanning a light for writing an electrostatic latent image on the surface of a image carrier, wherein the optical scanner comprises:
an optical scanning means for reflecting on a reflecting surface a light flux emitted from a light source, while at the same time, scanning said light flux in a linear direction as a main scanning direction toward a prescribed surface to be scanned; and
an image forming means disposed in between the optical scanning means and the surface to be scanned which forms an image on the surface to be scanned with a scanning light scanned by the optical scanning means, while at the same time, keeping the scanning speed of the scanning light nearly-constant on the surface to be scanned; and
wherein the image forming means comprises:
a first lens having a positive power in the main scanning direction and a negative power in the sub-scanning direction, that is orthogonal to the main scanning direction; and
a second lens which is disposed in a closer position to the surface to be scanned than the first lens and has a negative power in the main scanning direction and a positive power in the sub-scanning direction; and
wherein the optical scanner fulfills a $-1.2 \leq \phi2m/\phi tm \leq -0.48$ when a power of the image forming means, that combines the first lens and the second lens, in the main scanning direction is $\phi tm$, and a power of the second lens in the main scanning direction is $\phi2m$.

11. An optical scanner according to claim 2, wherein the first and second lenses are made of resin.

12. An image forming apparatus comprising an optical scanner for scanning a light for writing an electrostatic latent image on the surface of a image carrier, wherein the optical scanner comprises:
an optical scanning means for reflecting on a reflecting surface a light flux emitted from a light source, while at the same time, scanning said light flux in a linear direction as a main scanning direction toward a prescribed surface to be scanned; and
an image forming means disposed in between the optical scanning means and the surface to be scanned which forms an image on the surface to be scanned with a scanning light scanned by the optical scanning means, while at the same time, keeping the scanning speed of the scanning light nearly-constant on the surface to be scanned; and
wherein the image forming means comprises:
a first lens having a positive power in the main scanning direction and a negative power in the sub-scanning direction, that is orthogonal to the main scanning direction; and
a second lens which is disposed in a closer position to the surface to be scanned than the first lens and has a negative power in the main scanning direction and a positive power in the sub-scanning direction; and
wherein the optical scanner fulfills a condition: $1.32 \leq \phi1m/\phi tm \leq 2.00$ when a power of the image forming means, that combines the first lens and the second lens, in the main scanning direction is $\phi tm$, and a power of the first lens in the main scanning direction is $\phi1m$.

* * * * *